United States Patent
Sagawa et al.

(10) Patent No.: US 9,633,439 B2
(45) Date of Patent: Apr. 25, 2017

(54) IMAGE PROCESSING SYSTEM, AND IMAGE PROCESSING METHOD

(71) Applicants: National Institute of Advanced Industrial Science and Technology, Tokyo (JP); Kagoshima University, Kagoshima-shi (JP); Hiroshima City University, Hiroshima-shi (JP)

(72) Inventors: Ryusuke Sagawa, Tsukuba (JP); Hiroshi Kawasaki, Kagoshima (JP); Ryo Furukawa, Hiroshima (JP)

(73) Assignees: National Institute of Advanced Industrial Science and Technology, Tokyo (JP); Kagoshima University, Kagoshima-shi (JP); Hiroshima City University, Hiroshima-shi (JP)

( * ) Notice: Subject to any disclaimer, the term of this patent is extended or adjusted under 35 U.S.C. 154(b) by 120 days.

(21) Appl. No.: 14/418,663

(22) PCT Filed: Jun. 28, 2013

(86) PCT No.: PCT/JP2013/004059
§ 371 (c)(1),
(2) Date: Jan. 30, 2015

(87) PCT Pub. No.: WO2014/020823
PCT Pub. Date: Feb. 6, 2014

(65) Prior Publication Data
US 2015/0221093 A1    Aug. 6, 2015

(30) Foreign Application Priority Data
Jul. 30, 2012  (JP) .................................. 2012-168412

(51) Int. Cl.
G06T 7/00 (2006.01)
G01B 11/25 (2006.01)
G06T 1/00 (2006.01)

(52) U.S. Cl.
CPC ........ *G06T 7/0057* (2013.01); *G01B 11/2513* (2013.01); *G01B 11/2545* (2013.01); *G06T 1/0007* (2013.01); *G06T 2207/10012* (2013.01)

(58) Field of Classification Search
None
See application file for complete search history.

(56) References Cited

U.S. PATENT DOCUMENTS 7,768,656 B2    8/2010  Lapa et al.
2007/0090189 A1 4/2007  Suwa et al.
(Continued)

FOREIGN PATENT DOCUMENTS

CN    1952595 A    4/2007
CN    101765755 A   6/2010
(Continued)

OTHER PUBLICATIONS

Hassebrook, Laurence G., Aswinikumar Subramanian, and Prashant Pai. "Optimized three-dimensional recovery from two-dimensional images by means of sine wave structured light illumination." Optical Engineering 33.1 (1994): 219-229.*
(Continued)

*Primary Examiner* — Yu Chen
(74) *Attorney, Agent, or Firm* — Venable LLP; Michael A. Sartori; Ryan T. Ward

(57) ABSTRACT

A high-density shape reconstruction is conducted in measuring animal bodies as well. An image processing system has a projection device, an imaging device, and an image processing apparatus connected to the projection device and the imaging device, wherein the projection device projects a
(Continued)

projected pattern to an observation target, the imaging device captures the projected pattern, and the image processing apparatus performs shape reconstruction based on an input image including the projected pattern. The image processing apparatus includes a unit for fetching the input image captured by the imaging device and performing line detection for the projected pattern projected by the projection device, wherein the projected pattern is a grid pattern formed of wave lines; and a unit for performing shape reconstruction by associating intersection points of vertical and horizontal lines extracted by the line detection with the projected pattern.

10 Claims, 51 Drawing Sheets

(56) References Cited

U.S. PATENT DOCUMENTS

| | | | |
|---|---|---|---|
| 2010/0195114 | A1 | 8/2010 | Mitsumoto et al. |
| 2011/0058023 | A1* | 3/2011 | Boles ............... G01B 11/2513 348/46 |
| 2011/0081072 | A1 | 4/2011 | Kawasaki et al. |
| 2012/0098961 | A1 | 4/2012 | Handa et al. |
| 2012/0200671 | A1* | 8/2012 | Silveira ............. G02B 27/0025 348/46 |
| 2012/0269404 | A1* | 10/2012 | Hassebrook ....... G01B 11/2513 382/115 |

FOREIGN PATENT DOCUMENTS

| | | |
|---|---|---|
| CN | 102528810 A | 7/2012 |
| EP | 2372648 A2 | 5/2011 |
| JP | 2009-300277 A | 12/2009 |
| JP | 2011-242183 A | 12/2011 |

OTHER PUBLICATIONS

Sagawa, Ryusuke, et al. "Dense one-shot 3D reconstruction by detecting continuous regions with parallel line projection." 2011 International Conference on Computer Vision. IEEE, Nov. 2011.*

Sagawa, Ryusuke, et al. "Dense 3D reconstruction method using a single pattern for fast moving object." 2009 IEEE 12th International Conference on Computer Vision. IEEE, 2009.*

Ionescu et al., "3-D Object Model Recovery From 2-D Images Using Structured Light," IEEE Transactions on Instrumentation and Measurement, IEEE Service Center, Piscataway, NJ, US, vol. 53, No. 2, Apr. 1, 2004, pp. 437-443.

Le Moigne et al., "Structured Light Patterns for Robot Mobility," IEEE Journal of Robotics & Automation, IEEE Inc. New York, US, Oct. 1, 1988, pp. 541-548.

Whoi-Yul Yura Kim, Institute of Electrical and Electronics Engineers: "Experiment with Cross-Stripe Structured Light System Using Coon's Patch Formalism," Proceeding of the International Conference on Systems, Man, and Cybernetics. Los Angeles, Nov. 4-7, 1990, New York, IEEE, US, vol. -, Nov. 4, 1990.

Extended European Search Report in European Patent Application No. 13825095.6, dated Feb. 19, 2016.

Microsoft, "Xbox 360 Kinect," available at https://web.archive.org/web/20100813154433/http://www.xbox.com/en-US/kinect, 2010, pp. 1-3.

H. Kawasaki, R. Furukawa, R. Sagawa and Y. Yagi, "Dynamic scene shape reconstruction using a single structured light pattern," CVPR, pp. 1-8, Jun. 23-28, 2008.

R. Sagawa, Y. Ota, Y. Yagi, R. Furukawa, N. Asada and H. Kawasaki, "Dense 3d reconstruction method using a single pattern for fast moving object," ICCV, 2009.

A. O. Ulusoy, F. Calakli and G. Taubin, "One-shot scanning using de bruijn spaced grids," The 7th IEEE Conf. 3DIM, 2009.

J. Salvi, J. Batlle and E. Mouaddib, "A robust-coded pattern projection for dynamic 3D scene measurement," Pattern Recognition, vol. 19, No. 11, pp. 1055-1065, 1998.

C. Je, S. W. Lee and R. H. Park, "High-contrast color stripe pattern for rapid structured-light range imaging," ECCV, vol. 1, pp. 95-107, 2004.

L. Zhang, B. Curless and S. Seitz, "Rapid shape acquisition using color structured light and multi-pass dynamic programming," 3DPVT, pp. 24-36, 2002.

R. Sagawa, H. Kawasaki, R. Furukawa and S. Kiyota, "Dense one-shot 3d reconstruction by detecting continuous regions with parallel line projection," ICCV, 2011.

Canesta, Inc., "Canesta Vision EP Development Kit," available at https://web.archive.org/web/20041211190600/http://www.canesta.com/devkit.htm, 2010, pp. 1-3.

Mesa Imaging AG., "Swiss Ranger SR-4000," available at http://www.swissranger.ch/index.php, 2011, pp. 1-2.

S. Rusinkiewicz, O. Hall-Holt and M. Levoy, "Realtime 3D model acquisition," Proc. SIGGRAPH, pp. 438-446, 2002.

T. Weise, B. Leibe and L. V. Gool, "Fast 3D scanning with automatic motion compensation," CVPR, 2007.

S. G. Narasimhan, S. J. Koppel, and S. Yamazaki, "Temporal dithering of illumination for fast active vision," Proc. European Conference on Computer Vision, pp. 830-844, Oct. 2008.

L. Zhang, B. Curless and S. M. Seitz, "Space time stereo: Shape recovery for dynamic scenes," IEEE Computer Society Conference on Computer Vision and Pattern Recognition, pp. 367-374, Jun. 2003.

J. Tajima and M. Iwakawa, "3-D data acquisition by rainbow range finder," ICPR, pp. 309-313, 1990.

S. Zhang and P. Huang, "High-resolution, real-time 3D shape acquisition," Proc. Conference on Computer Vision and Pattern Recognition Workshop, p. 28, 2004.

M. Maruyama and S. Abe, "Range sensing by projecting multiple slits with random cuts," SPIE Optics, Illumination, and Image Sensing for Machine Vision IV, vol. 1194, pp. 216-224, 1989.

P. Vuylsteke and A. Oosterlinck, "Range image acquisition with a single binary-encoded light pattern,"IEEE Trans. on PAMI, vol. 12, No. 2, pp. 148-164, 1990.

P. Felzenszwalb and D. Huttenlocher, "Efficient belief propagation for early vision," IJCV, vol. 70, pp. 41-54, 2006.

"The Stanford 3D Scanning Repository," available at https://web.archive.org/web/20121120172507/http://wwwgraphics.stanford.edu/data/3Dscanrep/, 2012, pp. 1-6.

Persistence of Vision Pty. Ltd., "POV-Ray," available at https://web.archive.org/web/20040815013443/http://www.povray.org/, 2004, pp. 1-2.

Nozomu Kasuya et al., "Projector-Camera Active Stereo using Single-colored Wave Grid Pattern", ITE Technical Report, vol. 36, No. 43, Oct. 30, 2012 (Oct. 30, 2012), pp. 13 to 16.

R. Sagawa et al., "Grid-based Active Stereo with Single-colored Wave Pattern for Dense One-shot 3D Scan," 2012 Second Joint 3DIM/3DPVT Conference: 3D Imaging, Modeling, Processing, Visualization & Transmission, 2012, pp. 363-370.

R. Sagawa et al., "Linear solution for oneshot active 3D reconstruction using two projectors," 2014, pp .1-8.

International Preliminary Report on Patentability in PCT Application No. PCT/JP2013/004059 dated Feb. 12, 2015.

The First Office Action in Chinese Patent Application No. 201380040691.1, dated Jun. 14, 2016.

* cited by examiner

IMAGE PROCESSING SYSTEM, AND IMAGE PROCESSING METHOD

TECHNICAL FIELD

The present invention relates to an image processing system and an image processing method, and more particularly to an image processing system and an image processing method for performing dense shape reconstruction based on one-shot 3D measurement using a single-colored pattern.

BACKGROUND ART

In recent years, an attention has been drawn on reconstruction of a 3D moving scene. A great success has been achieved on, for example, a gaming product that serves as a device-free interface by measuring a human body in real time, and analyzing the motion of the human body (see, for example, NPL 1). Further, a research for employing such a product as the eyes of an autonomous mobile robot has been continued, and the importance of measurement of a moving object has been strongly noticed. As for currently employed moving object scanners, 3D scanners that measure static scenes cannot perform shape measurement as accurately and densely as existing scanners. However, if improvement of the accuracy and resolution is realized, these scanners should be more useful for various purposes, such as medical application and fluid analysis.

There are multiple methods present for measuring the shapes of moving objects, such as stereo methods using only cameras and laser scanning methods using Time-of-Flight (TOF) systems. Especially, a method for emitting structured light using a system that employs a projector and a camera is suitable for obtaining shape data of a moving object, and development and research for this method has been popular (see, for example, NPL1 to NPL4).

Structured-light projection methods are usually classified into two types: temporal-encoding methods and spatial-encoding methods. Since a spatial-encoding method is a method for performing shape reconstruction (one-shot scanning) based on a single image, it is ideal to measure a moving object at a high frame rate. Therefore, many researches have been involved in spatial-encoding methods. According to the spatial-encoding method, correspondence information that can be uniquely specified among the entire projected pattern is embedded directly in a two-dimensional pattern. An appropriately large area is required for this process, and therefore, the resolution for reconstruction tends to be low. Furthermore, decoding errors tend to occur due to, for example, distortion of a pattern caused by the change of the surface shape.

One of the methods available for efficiently embedding correspondence information in a two-dimensional pattern is the use of a color code. A method for employing multiple colors to embed a plurality of sets of bit data in individual points has been widely used (see, for example, NPL 3 and 5 to 8). However, in a case wherein color information is employed, it is required that the individual RGB color components be appropriately reflected on the surface of a target object. Further, for projectors available on the market, spectral distributions of the individual color components are overlapped each other, and therefore, an error tends to occur in determination of colors for individual pixels. To avoid this problem, a method using dot patterns or grid patterns have been proposed as a spatial-encoding method that does not use colors. However, the problems on ambiguities of correspondences and sparse reconstruction have not yet been resolved.

Generally, systems employing TOF scanners or active stereos are popular as active measurement systems. Further, various methods for active measurement of a moving object have been researched. In many TOF laser scanners, a point laser beam is projected to an object to be measured, and the interval time required until the laser beam returns to a detector is measured. Since measurement is performed for one point at a time, it is unsuitable for measurement of a large region in a short period of time. To measure a moving object, etc., there are devices proposed that project temporally-modulated light to a large area, observe the modulation of the light for the individual pixels of a 2D sensor, and acquire a depth image (see, for example, NPL 9 and 10). However, the present systems are easily affected by the interference of other light sources, and the resolution is lower than that for the normal cameras.

As for the measurement using the active stereo, in many cases, point laser beams or line laser beams are projected to an object, which is then scanned for measurement. This method is unsuitable for measurement of a moving object, because an extended period is required for measurement. The measurement period can be reduced by employing a planar light source, such as a video projector; however, a problem on ambiguity on correspondences must be resolved. For resolving the problem, there are typically two solutions, i.e., a temporal-encoding method and a spatial encoding method (see, for example, NPL 5).

According to the temporal-encoding method, multiple patterns are projected, and information is encoded in the temporal modulations of the individual points of the pattern. Thus, it is essentially unsuitable for measuring a moving object. To compensate for the shortcomings, there have been some methods proposed. For example, a method for changing the pattern with high frequencies (see, for example, NPL 11), a method for reducing the required number of patterns by using phase patterns (see, for example, NPL 12) and a method employing DMD patterns (see, for example, NPL 13) have been proposed.

As an approach slightly different from the normal active stereo, a spacetime stereo method, for example, has been proposed, whereby two or more cameras are employed to project a pattern that temporally changes (see, for example, NPL 14). At present, an example wherein measurement around 100 fps was successfully performed by employing motion estimation has also been introduced. However, since information for multiple frames is required, the method is not appropriate for measurement of an object that moves fast.

The spatial-encoding method is appropriate for measurement of a moving object, because the shape of an object is reconstructed by using a static pattern and based on only a single input image. However, since information must be embedded in certain spatial areas of the pattern, the resolution tends to be low. Moreover, determination of correspondences tends to be unstable because the patterns are distorted due to the color and the shape of the object surface. Therefore, many methods have been proposed to solve the problems. For example, a method using multiple color bands to avoid the same combinations of colors (see, for example, NPL 15 and 16), a method for employing unique dotted lines (see, for example, NPL 17 and 18) and a method for embedding information in a two-dimensional pattern (see, for example, NPL 1 and 19). However, there is not yet a method proposed whereby sufficient performances are provided in all aspects of precision, resolution, and stability.

CITATION LIST

Non Patent Literature

NPL 1: Microsoft, "Xbox 360 Kinect," 2010. http://www.xbox.com/en-US/Kinect.
NPL 2: H. Kawasaki, R. Furukawa, R. Sagawa and Y. Yagi, "Dynamic scene shape reconstruction using a single structured light pattern," CVPR, pp. 1-8, Jun. 23-28, 2008.
NPL 3: R. Sagawa, Y. Ota, Y. Yagi, R. Furukawa, N. Asada and H. Kawasaki, "Dense 3d reconstruction method using a single pattern for fast moving object", ICCV, 2009.
NPL 4: A. O. Ulusoy, F. Calakli and G. Taubin, "One-shot scanning using de bruijn spaced grids," The 7th IEEE Conf. 3DIM, 2009.
NPL 5: J. Salvi, J. Battle and E. M. Mouaddib, "A robust coded pattern projection for dynamic 3D scene measurement," Pattern Recognition, vol. 19, no. 11, pp. 1055-1065, 1998.
NPL 6: C. Je, S. W. Lee and R. H. Park, "High-contrast color stripe pattern for rapid structured-light range imaging," ECCV, vol. 1, pp. 95-107, 2004.
NPL 7: L. Zhang, B. Curless and S. Seitz, "Rapid shape acquisition using color structured light and multi-pass dynamic programming," 3DPVT, pp. 24-36, 2002.
NPL 8: R. Sagawa, H. Kawasaki, R. Furukawa and S. Kiyota, "Dense one-shot 3d reconstruction by detecting continuous regions with parallel line projection," ICCV, 2011.
NPL 9: Canesta, Inc., "Canesta Vision EP Development Kit," 2010. http://www.canesta.com/devkit.htm.
NPL 10: Mesa Imaging AG., "Swiss Ranger SR-4000," 2011. http://www.swissranger.ch/index.php.
NPL 11: S. Rusinkiewicz, O. Hall-Holt and M. Levoy, "Realtime 3D model acquisition," Proc. SIGGRAPH, pp. 438-446, 2002.
NPL 12: T. Weise, B. Leibe and L. V. Gool, "Fast 3D scanning with automatic motion compensation," CVPR, 2007.
NPL 13: S. G. Narasimhan, S. J. Koppal, and S. Yamazaki, "Temporal dithering of illumination for fast active vision," Proc. European Conference on Computer Vision, pp. 830-844, October 2008.
NPL 14: L. Zhang, B. Curless and S. M. Seitz, "Space time stereo: Shape recovery for dynamic scenes," IEEE Computer Society Conference on Computer Vision and Pattern Recognition, pp. 367-374, June 2003.
NPL 15: J. Tajima and M. Iwakawa, "3-D data acquisition by rainbow range finder," ICPR, pp. 309-313, 1990.
NPL 16: S. Zhang and P. Huang, "High-resolution, real-time 3D shape acquisition," Proc. Conference on Computer Vision and Pattern Recognition Workshop, p. 28, 2004.
NPL 17: M. Maruyama and S. Abe, "Range sensing by projecting multiple slits with random cuts," SPIE Optics, Illumination, and Image Sensing for Machine Vision IV, vol. 1194, pp. 216-224, 1989.
NPL 18: Artec, "United States Patent Application 2009005924," 2007j.
NPL 19: P. Vuylsteke and A. Oosterlinck, "Range image acquisition with a single binary-encoded light pattern," IEEE Trans. On PAMI, vol. 12, no. 2, pp. 148-164, 1990.
NPL 20: P. Felzenszwalb and D. Huttenlocher, "Efficient belief propagation for early vision," IJCV, vol. 70, pp. 41-54, 2006.
NPL 21: "The Stanford 3D Scanning Repository," http://www.graphics.stanford.edu/data/3Dscanrep/, 2012.
NPL 22: Persistence of Vision Pty. Ltd., "POV-Ray", 2004.

SUMMARY OF INVENTION

One objective of the present invention is to provide an image processing system and an image processing method, whereby shape reconstruction is performed based on one-shot 3D measurement using a single-colored pattern, and dense shape reconstruction is still enabled based on measurement of a moving object.

To achieve this objective, according to one embodiment of the present invention, an image processing system has a projection device, an imaging device, and an image processing apparatus connected to the projection device and the imaging device, wherein the projection device projects a projected pattern to an observation target, the imaging device captures the projected pattern, and the image processing apparatus performs shape reconstruction based on an input image including the projected pattern. The image processing apparatus includes a unit for fetching the input image captured by the imaging device and performing line detection for the projected pattern projected by the projection device, wherein the projected pattern is a grid pattern formed of wave lines; and a unit for performing shape reconstruction by associating intersection points of vertical and horizontal lines extracted by the line detection with the projected pattern.

According to another embodiment of the present invention, an image processing method performs shape reconstruction based on an input image including a projected pattern in an image processing apparatus connected to a projection device and an imaging device, wherein the projection device projects a projected pattern to an observation target, and the imaging device captures the projected pattern. The method includes the steps of: fetching, by the image processing apparatus, the input image captured by the imaging device, and performing line detection for the projected pattern projected by the projection device, wherein the projected pattern is a grid pattern formed of wave lines; and performing, by the image processing apparatus, shape reconstruction by associating intersection points of vertical and horizontal lines extracted by the line detection with the projected pattern.

As described above, according to the present invention, since shape reconstruction is performed for a grid pattern formed of wave lines based on one-shot 3D measurement using a single-colored pattern, dense shape reconstruction can be performed even based on the measurement of a moving object.

DESCRIPTION OF EMBODIMENTS

The embodiments of the present invention will now be described in detail, while referring to drawings. In the embodiments of this invention, a spatial-encoding method using the continuity of a grid pattern is employed. It is known that this method has problems on ambiguity of correspondences of points and erroneous reconstruction caused by incorrect determination of the continuity of the detected lines (see, for example, NPL 2 to 4). To resolve these problems, the use of a grid pattern formed of a plurality of colors has been proposed for a conventional method. However, since the conventional method is adversely affected by the reflectivity and the texture of the surface of a target object, stable measurement cannot be performed. In this embodiment, a single-colored grid pattern is employed, and the two problems for a grid pattern and a multi-colored pattern can be resolved at the same time.

First Embodiment

Figure 1:
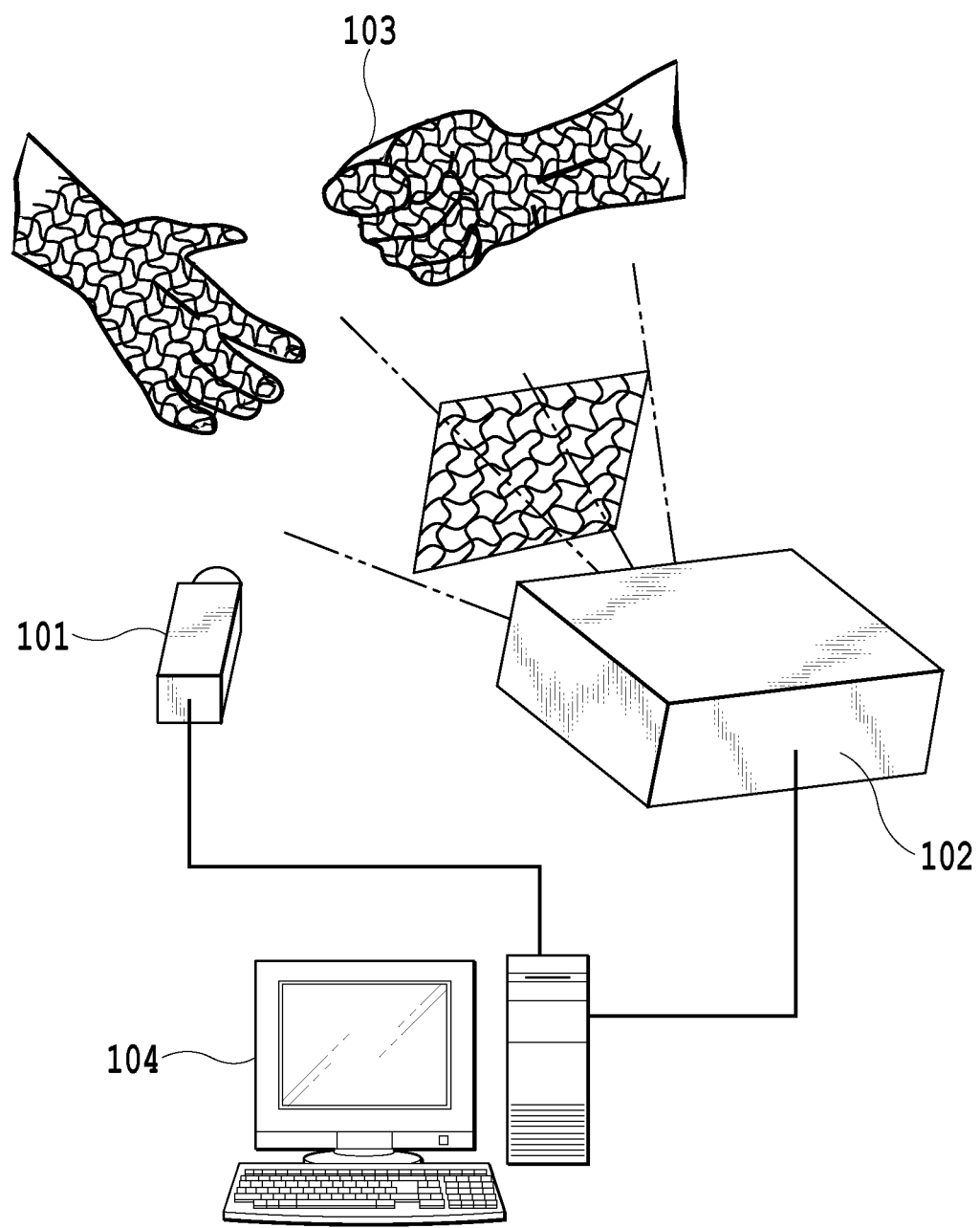
FIG. 1 is a diagram showing the configuration of an image processing system according to a first embodiment of the present invention.

An image processing system according to a first embodiment of the present invention is illustrated in FIG. 1. One camera 101 (imaging device) and one projector 102 (projection device) are employed. The projector 102 projects, to an observation target 103, a grid pattern formed of wave lines. Since a projected pattern is a static pattern, synchronization with projection is not required. Therefore, measurement with a very high FPS (Frames Per Second) is enabled. The camera 101 and the projector 102 are connected to an image processing apparatus 104 that includes a personal computer.

The image processing apparatus 104 stores projected patterns, such as grid patterns formed of wave lines, in a storage medium in advance, and can transmit projected pattern data to the projector 102 to project the pattern to the observation target 103. Further, the image processing apparatus 104 fetches an input image captured by the camera 101, stores the input image in the storage medium, and performs the image processing for shape reconstruction based on the input image.

Figure 2:
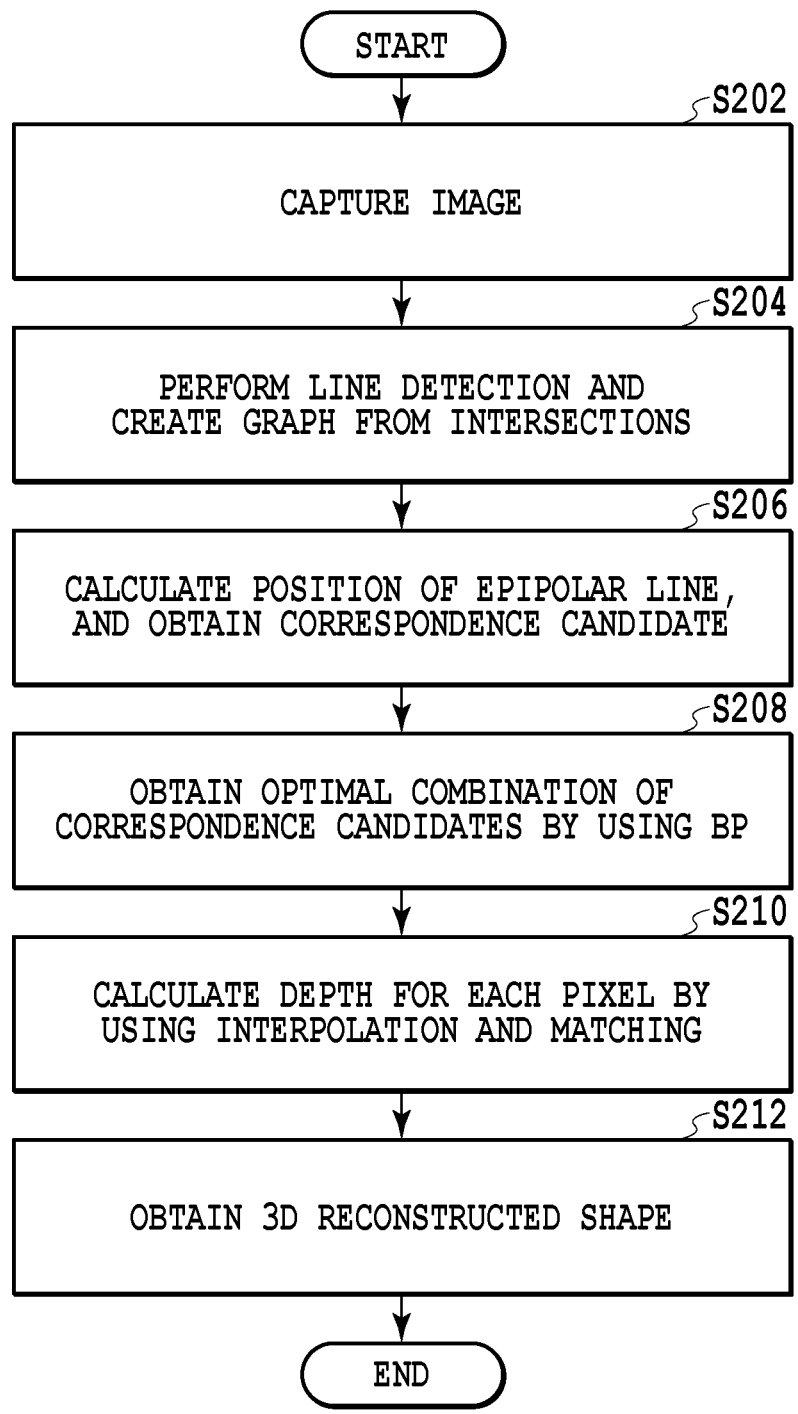
FIG. 2 is a flowchart showing a shape reconstruction algorithm according to the first embodiment of the present invention.

A shape reconstruction algorithm for the first embodiment of the present invention is shown in FIG. 2. First, a grid pattern formed of wave lines is projected to an observation target to capture an image (S202). Then, line detection for the captured image is performed by employing a method described in NPL 3. Based on optimization using the Belief Propagation (BP) method, vertical lines and horizontal lines of a single-colored grid can be stably and separately detected. Intersection points are calculated based on the detected vertical and horizontal lines, and a graph is created by employing the intersection points as nodes (S204).

For each node, the position of the epipolar line on the projected pattern is calculated to find a correspondence, and in a case wherein the intersection point is present along the line, this point is defined as a correspondence candidate. Since multiple candidates of correspondences are usually found, the optimal combination of the correspondence candidates is obtained for each point by using the BP (S208). Since the reconstruction result is still sparse, the depths of all the pixels are calculated by performing interpolation and pixel-wise matching between the pattern and the captured image (S210), and as a result, a dense 3D shape is reconstructed (S212).

To obtain unique correspondences between the camera image (an image captured on the camera's image plane) and a projector image (a pattern projected from the projector's image plane) by spatial encoding, a complicated pattern having the size of a large window has been required for the conventional methods. Moreover, while a broad baseline is desirable to improve accuracy, the observed pattern will be greatly distorted, which makes it practically difficult to decode the pattern. Therefore, a simple but highly unique pattern that is to be easily detected and decoded is desirable. In this embodiment, a pattern that gives information related to the priority for matching is employed, instead of a pattern for which the correspondence is uniquely determined through the image processing. Specifically, a grid pattern formed of vertical and horizontal wave lines is employed.

Figure 3A:
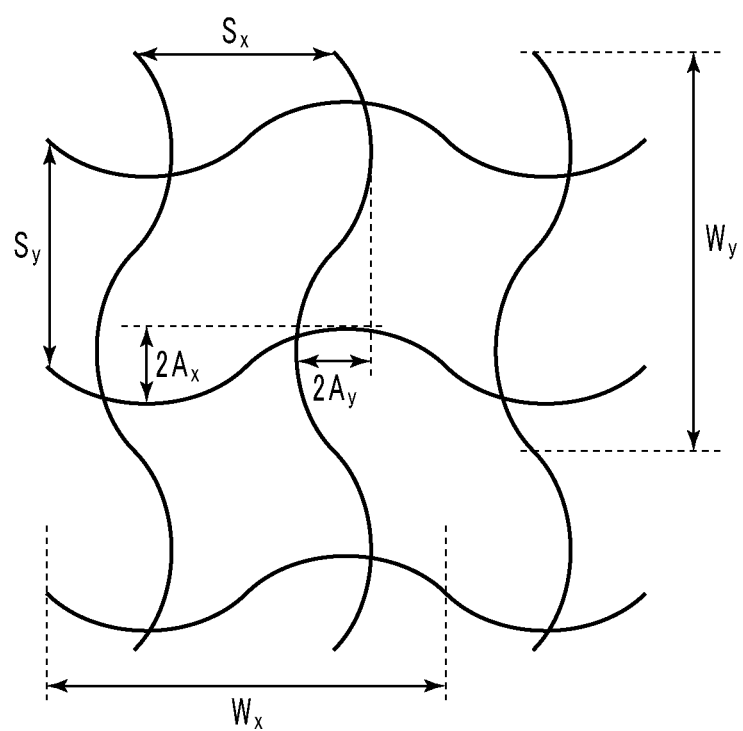
FIG. 3A is a diagram showing an example grid pattern formed of wave lines.

An example grid pattern consisting of wave lines is shown in FIG. 3A. Since the wave grid pattern is a simple pattern, it is easy to detect curves in the image pattern, and the position of a curve can be calculated in sub-pixel accuracy by detecting peaks of intensities of the curve. For both the vertical and horizontal wave lines, a wavy curve line, such as a periodic sinusoidal pattern, that is periodic and self-recurring, is employed. The vertical wave lines and the horizontal wave lines are multiple wave lines arranged at constant intervals, and the grid pattern of the wave lines is formed of a set of wave lines that are across each other in two directions.

The grid pattern of wave lines provides useful information for detecting correspondences. In this embodiment, the intersection points of vertical and horizontal wave lines are employed as feature points. The arrangement of intersection points is determined by the intervals and the wavelengths of the wave lines. The same interval and wavelength are employed for the wave lines; however, as will be described below, in a case wherein the interval of the vertical wave lines is not equal to the integral multiple of the wavelength of the horizontal wave lines (or in a case wherein the interval of the horizontal wave lines is not equal to the integral multiple of the wavelength of the vertical wave lines), the intersection points appear at the different phases. It means that the local pattern is shifted from the peripheral intersection point, and this difference can be used as a discriminative feature.

The local pattern around an intersection point is not unique in the whole projected pattern. Therefore, the same pattern appears at every Nx and Ny wave lines along the horizontal and vertical axes, based on $$Nx = lcm(Sx, Wx)/Sx$$

$$Ny = lcm(Sy, Wy)/Sy$$

where Sx and Sy in FIG. 3A are defined as the intervals between adjacent wave lines, and Wx and Wy are defined as wavelengths. In this case, it is assumed that lcm(a, b) is the least common multiple of a and b, and subscript letters x and y represent values along the vertical and horizontal axes, respectively. The local patterns, however, can be discriminative in each cycle.

Figure 3B:
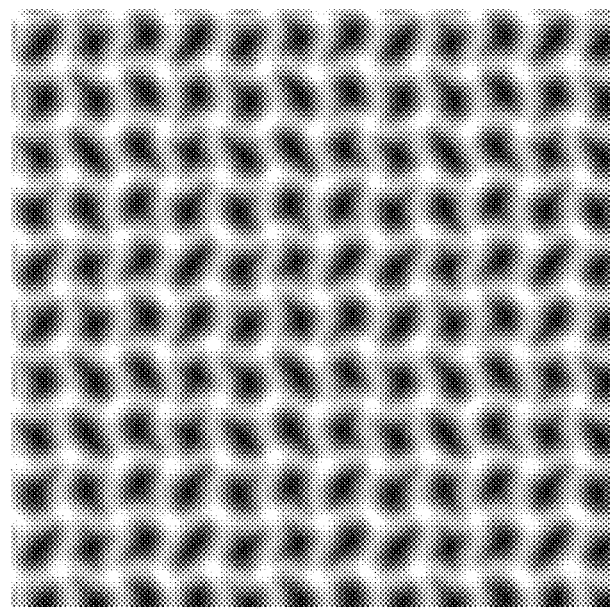
FIG. 3B is a diagram showing a static pattern projected by a projector.

A static pattern projected by the projector 102 is shown in FIG. 3B. This pattern is a single-colored pattern wherein vertical and horizontal sinusoidal wave lines are arranged in the form of a grid. The example in FIG. 3B is a pattern formed (in the unit of pixels) by
Sx=10, Sy=11, Wx=Wy=14, Ax=Ay=1.

In this example, each cycle has 7 and 14 wave lines along horizontal and vertical axes, respectively. Consequently, 98 (=7×14) intersection points are present in a rectangle formed in one cycle.

In stereo matching, the candidates of corresponding points are limited to the points on the epipolar line. In a case wherein an intersection point of a specific projector image is located within a certain distance from the epipolar line, the intersection point of the projector image is selected as a candidate. The number of candidates depends on the positions of intersection points in the camera image. Since the correspondence candidates are sparsely located in the projector image, the number of correspondence candidates is much smaller than that employed for pixel-based stereo for searching for candidate points.

Figure 4A:
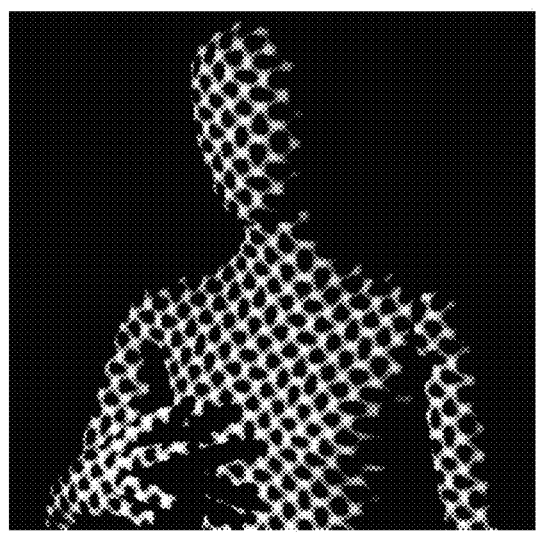
FIG. 4A is a diagram showing an image captured by projecting a grid pattern formed of wave lines to an observation target.
Figure 4B:
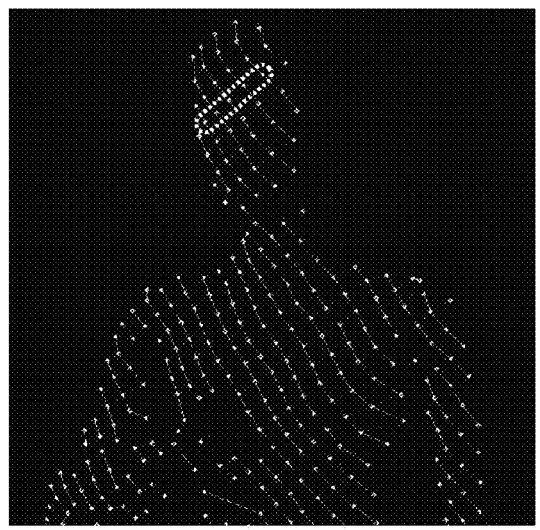
FIG. 4B is a diagram showing the results obtained by performing line detection for the grid pattern formed of wave lines.

To find the best combinations of correspondences, a method using regularization with local matching will be described while referring to FIGS. 4A and 4B. An image in FIG. 4A is the one obtained by projecting a grid pattern of wave lines to an observation target. The result obtained by line detection is shown in FIG. 4B. An intersection point of a vertical line and a horizontal line in a grid pattern of wave lines in a camera image is hereafter called a "grid point". If a plurality of grid points are connected with each other by a grid line, these intersection points should be on the same wave line on the projector image. This is employed for regularization in order to determine corresponding points.

The connectivity of grid points is obtained by the line detection. There is a case, however, wherein the connectivity might be incorrectly determined through the line detection. Such incorrect determination occurs especially for the boundaries where discontinuity of the shape appears. Therefore, to assign the corresponding points for the individual grid points, the energy minimization defined on the grid is employed.

First, a matching cost is calculated for all the correspondence candidates, and is employed as a data term for energy minimization. The cost is computed as an SSD (Sum of Squared Difference) between the camera image and the projector image (pattern image). However, since there is an error for the detected position of the grid point, and the pattern captured by the camera is distorted according to the surface of the target object, the simple SSD with respect to a quadrilateral area is unsuitable for the data term. Therefore, a patch obtained by approximating the area around the grid point of the target object to the tangent plane of the grid point is employed. With this patch, a more accurate matching cost can be calculated, and the corresponding points can be calculated in sub-pixel accuracy.

Figure 5:
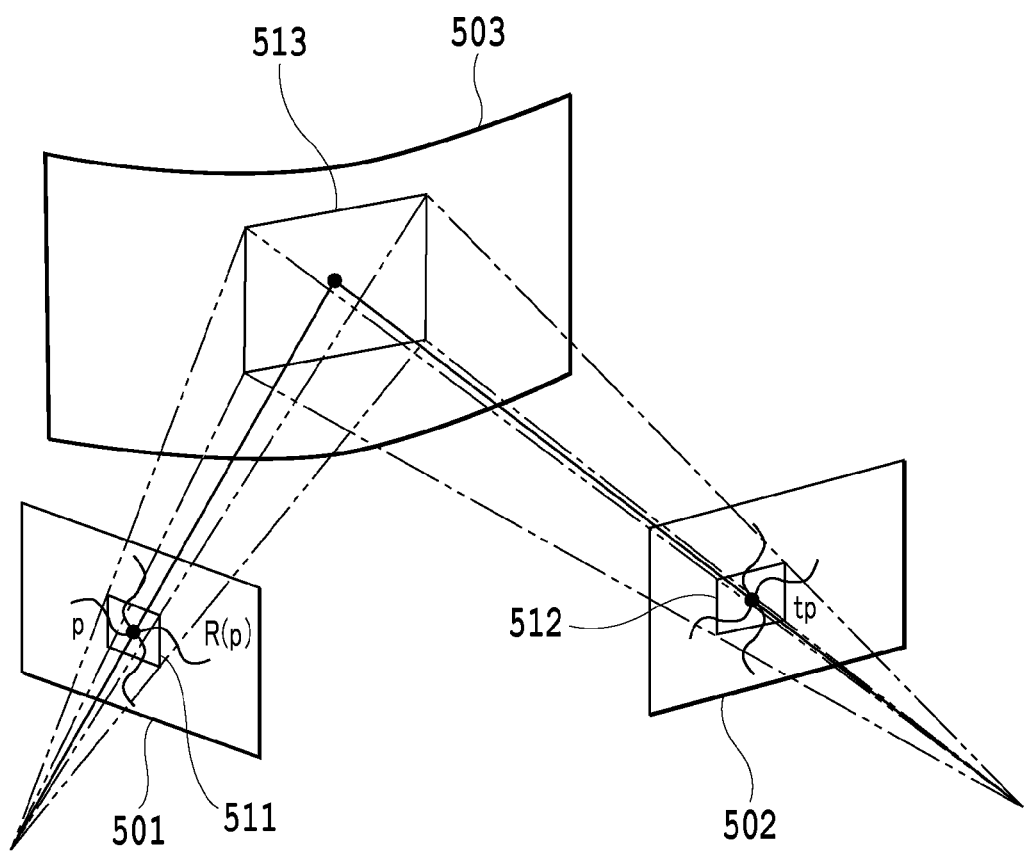
FIG. 5 is a diagram showing a patch approximated to a tangent plane around a grid point.

A patch obtained by approximation to the tangent plane of a grid point is shown in FIG. 5. It is assumed that a shape pattern (a quadrilateral patch 513) around a grid point on a surface 503 of an observation target is locally planar. This plane is represented by $$ax+by+cz+1=0.$$

It should be noted that a, b and c are parameters of a plane. The parameters are calculated by minimizing the SSD, while taking the distortion of an image into account.

The algorithm employed for calculation is as follows:
(1) Project a quadrilateral patch R(p) 511 around a grid point p in a camera image 501 to the 3D tangent plane, and re-project this patch onto a projector image 502.
(2) Calculate the SSD of the intensities between the re-projected quadrilateral patch 512 and the projector image 502.
(3) Employ a, b and c as variables to minimize the SSD value.
(4) Repeat the above steps for several times.
The initial values of a, b and c are set, so that the tangent plane includes the 3D position of the grid point computed using a parallax error, and is parallel to the camera's image plane, and the SSD value is represented by the following equation:

[Ex. 1]

$$SSD_{a,b,c}(p) = \sum_{p' \in R(p)} (I_c(p') - I_p(H_{a,b,c}(p')))^2 \qquad (1)$$

In this case, R(p) is a quadrilateral patch around p and $H_{a,b,c}(p')$ is the transformation in a case wherein p' is re-projected to the projector's image plane. $I_c(\bullet)$ and $I_p(\bullet)$ are the intensities of the camera image and the projector image, respectively.

In this case, the grid pattern consists of nodes p∈V, which are grid points, and edges (p, q)∈U that represent the connections of the grid points. It should be noted that p and q are grid points, V is a set of grid points, and U is a set of edges of a grid graph. A grid point p includes correspondence candidates $t_p \in T_p$. In this case, $T_p$ is a set of correspondence candidates for the grid point p. While a set of correspondences is employed as a parameter, the energy for stereo matching is defined as follows:

[Ex. 2]

$$E(T) = \sum_{p \in V} D_p(t_p) + \sum_{(p,q) \in U} W_{pq}(t_p, t_q) \qquad (2)$$

It should be noted that T={$t_p$|p∈V}, and $D_p(t_p)$ is a data term in case of assigning the point corresponding to p to the candidate $t_p$. $W_{pq}(t_p, t_q)$ is a regularization term used to assign candidates $t_p$ and $t_q$ to neighboring grid points.

The data term is a value of the SSD calculated by the method described above. The regularization term is defined as follows:

[Ex. 3]

$$W_{pq}(t_p, t_q) = \begin{cases} 0 & \text{in case of } t_p \text{ and } t_q \text{ on the same wave line} \\ \lambda & \text{in cases other than the above case} \end{cases} \qquad (3)$$

It should be noted that λ is a user-defined constant. The energy is minimized by the BP method.

An advantage of using energy minimization is that the regularization terms defined using the neighboring grid points can be "soft constraints." This is important because, according to the actual data, there is always a chance that incorrect grid connections might be generated due to erroneous line detection. According to NPL 3, wrong connection should be removed at the stage of line detection before 3D reconstruction is started, while in this embodiment, removal of wrong connection and 3D reconstruction are simultaneously performed, and therefore, reconstruction with higher density and higher accuracy is enabled.

The correspondences for sparse grid points are obtained by the grid-based stereo matching method. At the next step, dense correspondences are acquired by using information for all the pixels. In this process, depth values of densely resampled pixel samples are calculated by interpolating the grid points. Then, the depth values of these pixel samples are employed as variables to minimize a difference of intensities between the camera image and the projector image.

A method employed based on interpolation of the detected grid lines is described in NPL 8. In this embodiment, independent depth estimation for each (sub) pixel is achieved by optimization based on photo-consistency.

When a viewing vector from the camera origin to a pixel x is represented as (u, v, 1), the depth dx for the pixel is computed as follows.

[Ex. 4]

$$d_x = \frac{-1}{a_x u + b_x v + c_x} \qquad (4)$$

It should be noted that $a_x$, $b_x$ and $c_x$ are the parameters computed for the pixel. $a_x$ for each pixel is interpolated as follows:

[Ex. 5]

$$a_x = \frac{\sum_p G(|p-x|)a_p}{\sum_p G(|p-x|)} \quad (5)$$

It should be noted that p is a grid point, G(•) is a Gaussian function and |p−x| is a distance between p and x. $b_x$ and $c_x$ are calculated in the same manner by weighted averaging.

For optimization, it is possible that the depths of all the pixels are employed as independent variables to estimate the depths of all the pixels (pixel-based depth estimation). However, in this embodiment, a triangular mesh formed of three pixel samples is resampled to estimate the depths of the pixel samples (sub-pixel based depth estimation). As a result, the more appropriate resolution of the triangular mesh can be obtained. When the estimation for the depth is simply performed for all of the pixels, the accuracy might be reduced, because the resolution of a pattern to be projected is lower than the image resolution. To resolve this problem, a method for using a matching window having a certain size, for example, can be employed; however, the calculation cost would be increased.

Figure 6:
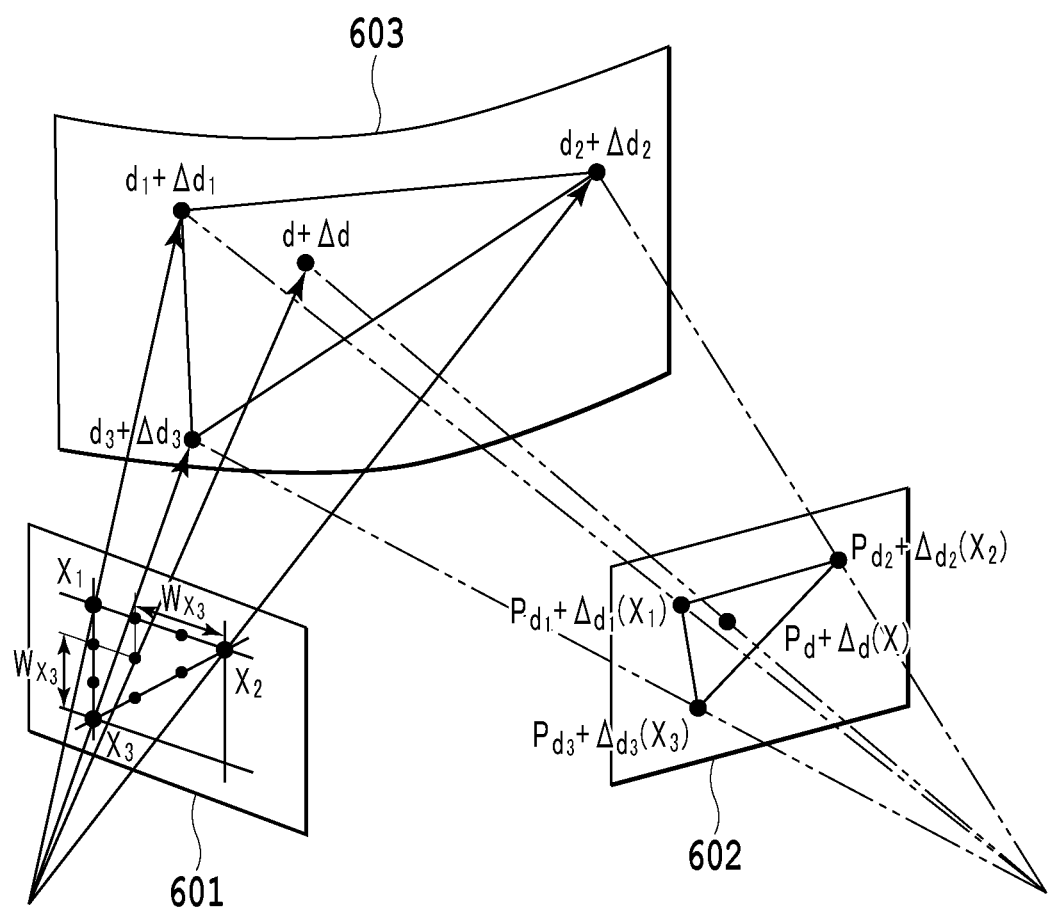
FIG. 6 is a diagram for explaining estimation of a depth for each subpixel.

In contrast, in this embodiment, the following method is employed to reduce the number of points and the number of variables without scarifying the accuracy, and to perform efficient calculation. The sub-pixel based depth estimation will be described while referring to FIG. 6. First, a triangular mesh is created by employing three pixel samples in an image to be observed. The depths of the pixels other than the pixel samples are linearly interpolated. For optimization by the repetitive calculation, approximation of the depth is performed by employing, as a variable, a small displacement $\Delta d_x$ of $d_x$. The depth of pixel x in FIG. 6 is calculated as follows:

[Ex. 6]

$$d_x + \Delta d_x = [1 - w_{x2} - w_{x3}, w_{x2}, w_{x3}] \begin{bmatrix} d_{x1} + \Delta d_{x1} \\ d_{x2} + \Delta d_{x2} \\ d_{x3} + \Delta d_{x3} \end{bmatrix}$$

It should be noted that $w_{x2}$ and $w_{x3}$ are the weights for linear interpolation. Now, D+ΔD is a vector obtained by collecting $d_x + \Delta d_x$ for all the pixel samples. A reprojection error for the projector image (the pattern image) is calculated for all the pixels including the pixel samples by using the following expression:

[Ex. 7]

$$E(\Delta D) = \sum_x (I_c(x) - I_p(P_{D+\Delta D}(x)))^2 + \gamma \sum_{x,x'} (\Delta d_x - \Delta d_{x'})^2 \quad (6)$$

It should be noted that the position of reprojection onto the projector image is represented by $P_{D+\Delta D}(x)$. For reprojection of each pixel, part of D+ΔD is employed. x and x' are adjacent vertices. γ is a user-defined parameter for regularization. The parameter ΔD is determined so as to minimize the error. When the reprojection and minimization are alternatively and repetitively performed until convergence of a solution is reached, the depth D is determined.

Second Embodiment

Figure 7:
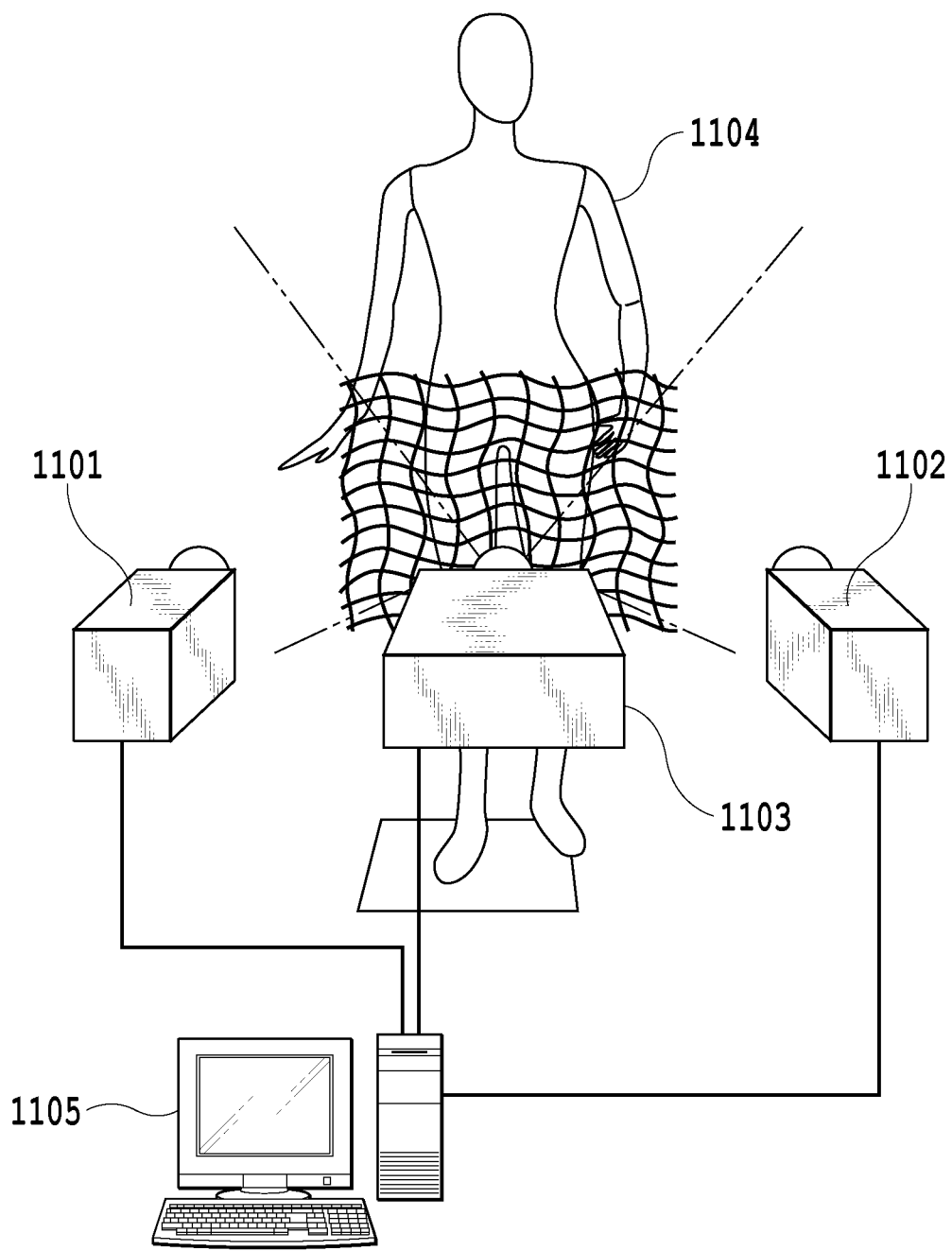
FIG. 7 is a diagram illustrating the configuration of an image processing system according to a second embodiment of the present invention.

An image processing system according to a second embodiment of the present invention is illustrated in FIG. 7. Two cameras 1101 and 1102 (imaging devices) and one projector 1103 (projection device) are employed. The projector 1103 projects, to an observation target 1104, a grid pattern formed of wave lines. Since a projected pattern is a static pattern, synchronization with projection is not required. Therefore, measurement with a very high FPS (Frames Per Second) is enabled. The cameras 1101 and 1102 and the projector 1103 are connected to an image processing apparatus 1105 that includes a personal computer.

The image processing apparatus 1105 stores projected patterns, such as grid patterns formed of wave lines, in a storage medium in advance, and can transmit projected pattern data to the projector 1103 to project the pattern to the observation target 1104. Further, the image processing apparatus 1105 fetches input images captured by the cameras 1101 and 1102, stores the input images in the storage medium, and performs the image processing for shape reconstruction based on the input images.

According to the second embodiment, the constraint condition between the two cameras is employed as additional information to find correspondence candidates. A method for assigning corresponding points based on the energy minimization on the grid graph will now be described. The additional constraints are introduced as the edges that connect graphs of two cameras. Generation of edges between two grid graphs will be described while referring to FIG. 8. First, a grid pattern of wave lines is projected to an observation target to capture an image. Then, line detection is performed for the projected image, intersection points are calculated based on the detected vertical and horizontal lines, and a grid graph is created by employing the intersection points as nodes.

A search for a corresponding point in a projected pattern 1201 for a node $p_0$ of the camera 1101 will be described. The correspondence candidates $t_{p0} \epsilon T_{p0}$ are the intersection points of a projected pattern 1204 on an epipolar line 1211 of a grid point $p_0$, while $T_{p0}$ is a set of the correspondence candidates for the grid point $p_0$. When it is assumed that the correspondence candidate of the grid point $p_0$ is $t_{p0}$, the coordinates $P_{3D}(t_{p0})$ for the grid point $p_0$ on a surface 1203 of the observation target 1104 are calculated by triangulation between the camera 1101 and the projector 1103. $P_1(t_{p0})$ is the point at which the coordinates point $P_{3D}(t_{p0})$ is projected onto a grid pattern 1202 of the camera 1102. When the grid point $p_1$ of the camera 1102 satisfies the following expression, the grid point $p_0$ and the grid point $p_1$ are associated with each other (linear line L1).

$$D(p_1, P_1(t_{p0})) < \theta \text{ and } t_{p0} \epsilon T_{p1}$$

Here, D(a, b) is a distance between points a and b, θ is the radius of the search area for a grid point near $P_1(t_{p0})$, and $T_{p1}$ is a set of correspondence candidates $t_{p1}$.

Figure 8:
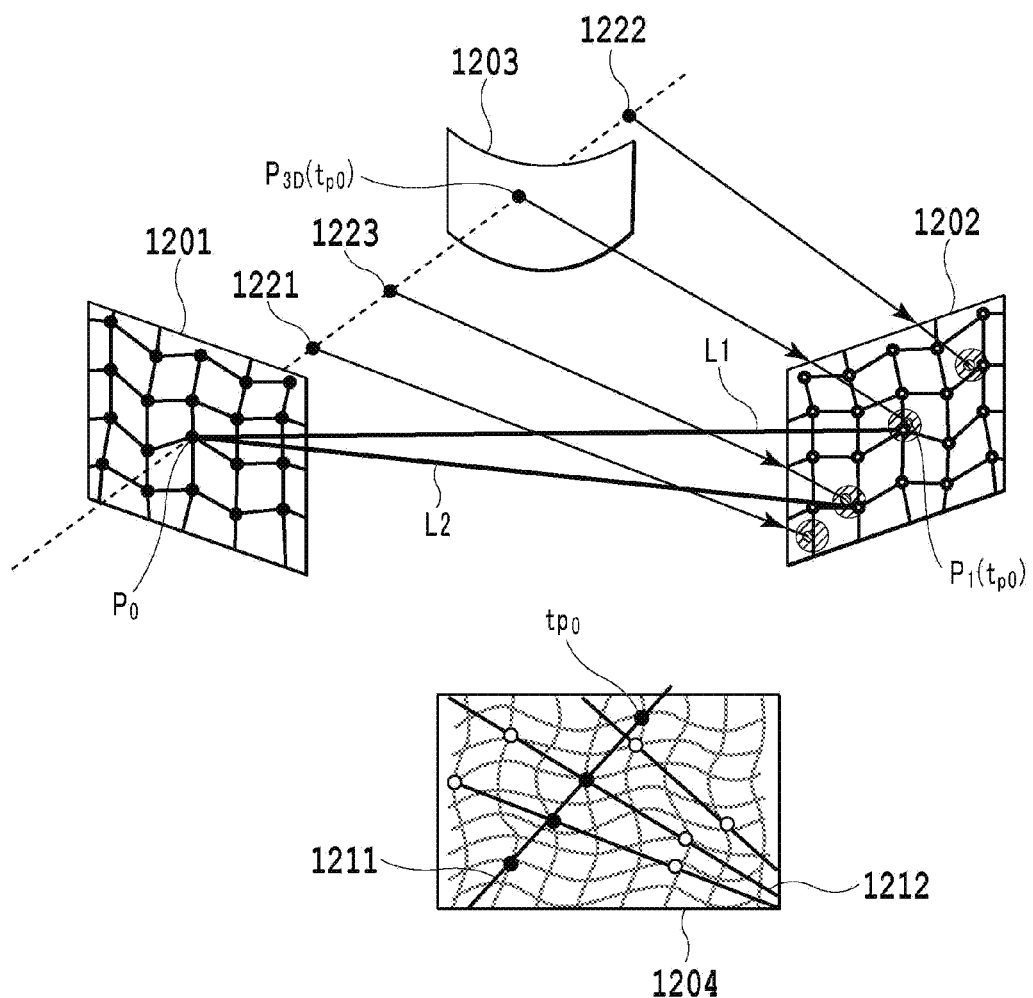
FIG. 8 is a diagram for explaining generation of edges between two grid graphs.

Referring to FIG. 8, four points $P_{3D}(t_{p0})$ are projected, and as for the leftmost point $P_{3D}(t_{p0})$ 1221, no grid points are present in the search area on the grid pattern 1202, and no correspondence candidates are found. As for the rightmost point $P_{3D}(t_{p0})$ 1222, a grid point $p_1$ is present in the search area of the grid pattern 1202, while the same correspondence candidate $t_{p0}$ is not present in the set $T_{p1}$ of correspondence candidates along the epipolar line 1212 for the grid point $p_1$.

Two points at $P_{3D}(t_{p0})$ in the middle satisfy the above condition, and are connected to the grid points $p_0$. Once the edges between the two cameras are connected together on the graph (linear line L1), a single graph is established to easily search for the corresponding points for the two cameras.

There is a chance wherein some incorrect edges might be generated by using this method (linear line L2). A second projection point 1223 in FIG. 8 is an incorrect edge, which is not on the surface 1203 of the observation target 1104. It should be noted, however, that even if a grid point has both correct and incorrect edges, the total cost of the BP is not adversely affected by the incorrect edge. In a case wherein a grid point has only incorrect edges, it is determined that the candidate of correspondence is false in the process of BP, so long as the number of incorrect edges is small.

Now, a single grid graph is obtained for two cameras by detecting lines and by reprojecting points by one camera to the other camera. Next, the best combination of correspondences is to be found by performing the energy minimization on the grid graph. The grid graph consists of grid points $p_0 \epsilon V_0$ and $p_1 \epsilon V_1$, edges $(p_0, q_0) \epsilon U_0$ and $(p_1, q_1) \epsilon U_1$ obtained by line detection, and edges $(p_0, p_1) \epsilon S$ obtained between the cameras. As for the camera 1101, $p_0$ and $q_0$ are grid points, $V_0$ is a set of grid points and $U_0$ is a set of edges. As for the camera 1102, $p_1$ and $q_1$ are grid points, $V_1$ is a set of grid points and $U_1$ is a set of edges. S is a set of edges between the cameras. A grid point $P_0$ includes the correspondence candidates $t_{p0} \epsilon T_{p0}$ of the projector pattern.

For the one-camera one-projector system in the first embodiment, the energy used to assign corresponding points tp0 to the individual grid points p0 is defined by the following expression (2). When this definition is extended for the use in the two-camera one projector system in this embodiment, the following expression is established:

[Ex. 8]

$$E(T) = E(T_0) + E(T_1) + \sum_{(p_0,p_1) \in S} X_{p_0 p_1}(t_{p0}, t_{p1}) \qquad (7)$$

It should be noted that $X_{p_0, p_1}(t_{p0}, t_{p1})$ is a regularization term for the edges $(p_0, p_1)$ between cameras. This term is represented as:

[Ex. 9]

$$X_{p_0 p_1}(t_{p0}, t_{p1}) = \begin{cases} 0 & t_{p0} = t_{p1} \\ \mu & \text{in other cases} \end{cases} \qquad (8)$$

It should be noted that where μ is a user-defined constant. When a grid point p has camera-camera edges, one of the camera-camera edges is selected for the assignment of $t_p$ for the grid point. This is because the energy will be increased if the assignment of an edge other than the edge between the cameras is selected.

In the first embodiment, a dense range image has been created by interpolating the grid graph in the camera image. The two-camera one-projector system in this embodiment provides two sets of grid graphs. When the graphs are created on the camera image, there is a case wherein the graphs are partially occluded from the other camera, and it is not possible to integrate the grid graphs and to perform dense reconstruction. Therefore, reprojection is performed for the graphs obtained by the two cameras to merge pixel information in the coordinate system of the projector.

Figure 9:
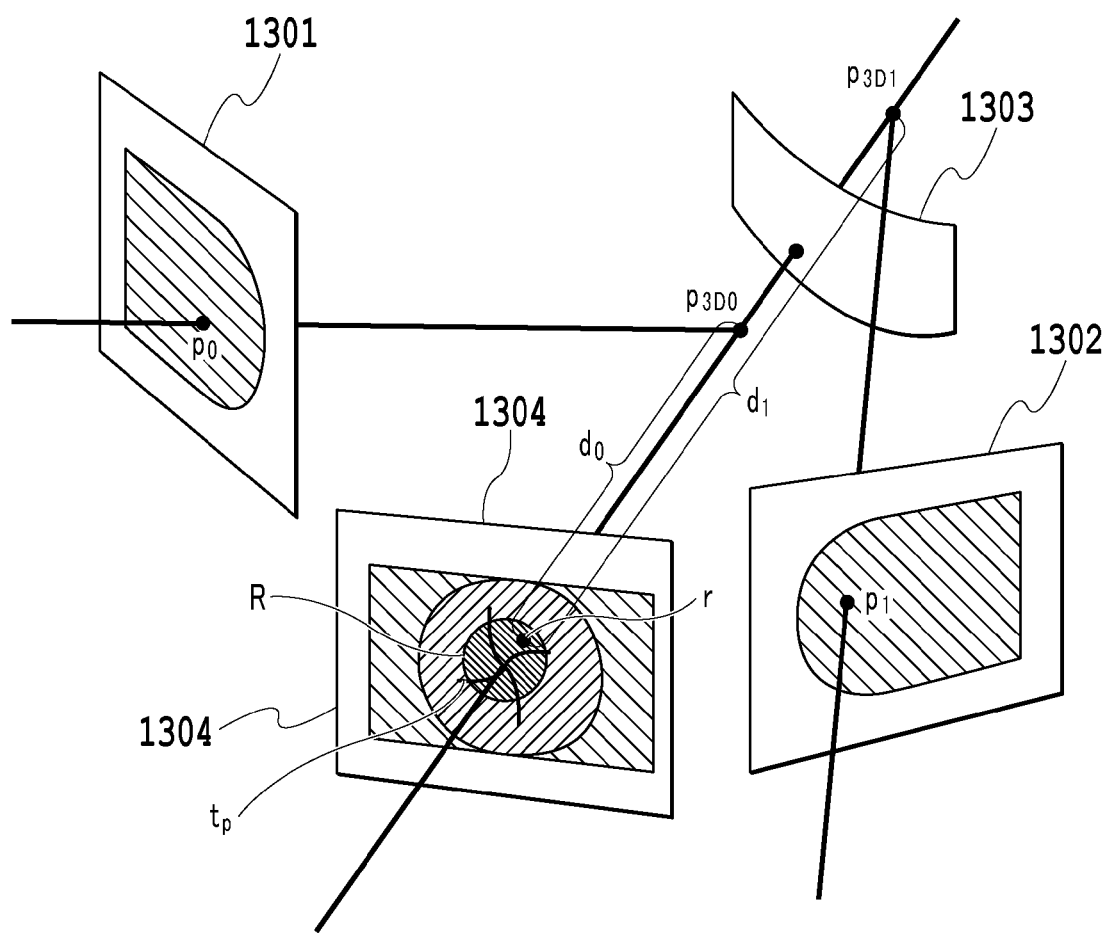
FIG. 9 is a diagram showing correspondences of grid points of a projector pattern and grid points of a camera.

A case wherein a grid point $t_p$ of the projector pattern is associated with grid points $p_0$ and $p_1$ of the two cameras is shown in FIG. 9. A grid pattern 1304 for the projector 1103 is inserted between a grid pattern 1301 for the camera 1101 and a grid pattern 1302 for the camera 1102 to calculate coordinates $P_{3D}$ on a surface 1302 of the observation target 1104. Two coordinate points $P_{3D0}$ and $p_{3D1}$ are calculated by the two corresponding points; however, these points do not usually match due to the error of image processing. Therefore, when a pixel r is present in the peripheral range (R) of the grid point $t_p$, the depths $d_0$ and $d_1$ from the viewpoint of the projector are integrated by averaging the depths $d_0$ and $d_1$. To generate a dense range image, the depth $d_r$ for the pixel r is defined as follows:

[Ex. 10]

$$d_r = \frac{1}{|R|} \sum_{(t_p, p) \in R} d(t_p, p), \ R = R_0 \cup R_1 \qquad (9)$$

$$R_k = \{(t_{pk}, p_k) \mid D(r, t_{pk}) < \tau, \ p_k \in V_k\} \qquad (10)$$

Here, $d(t_p, p)$ is the depth of the coordinate system calculated based on $t_p$ and p. Further, $D(r, t_{pk})$ is a distance between two points r and $t_{pk}$, and τ is a user-defined parameter to determine the neighborhood of a grid point. Since every coordinate point $p_{3D}$ is visible from the projector, the depth information can be merged. An example method employed for calculation of $d(t_p, p)$ can be linear interpolation (e.g., bilinear interpolation) in consonance with the distance extended from a set of the grid point $t_p$ and the neighboring grid point to p. Furthermore, the weighted average may be employed for calculating expression (9) to obtain the average. An angle formed by the camera and the projector, for example, can be employed for weighting.

Third Embodiment

Figure 10:
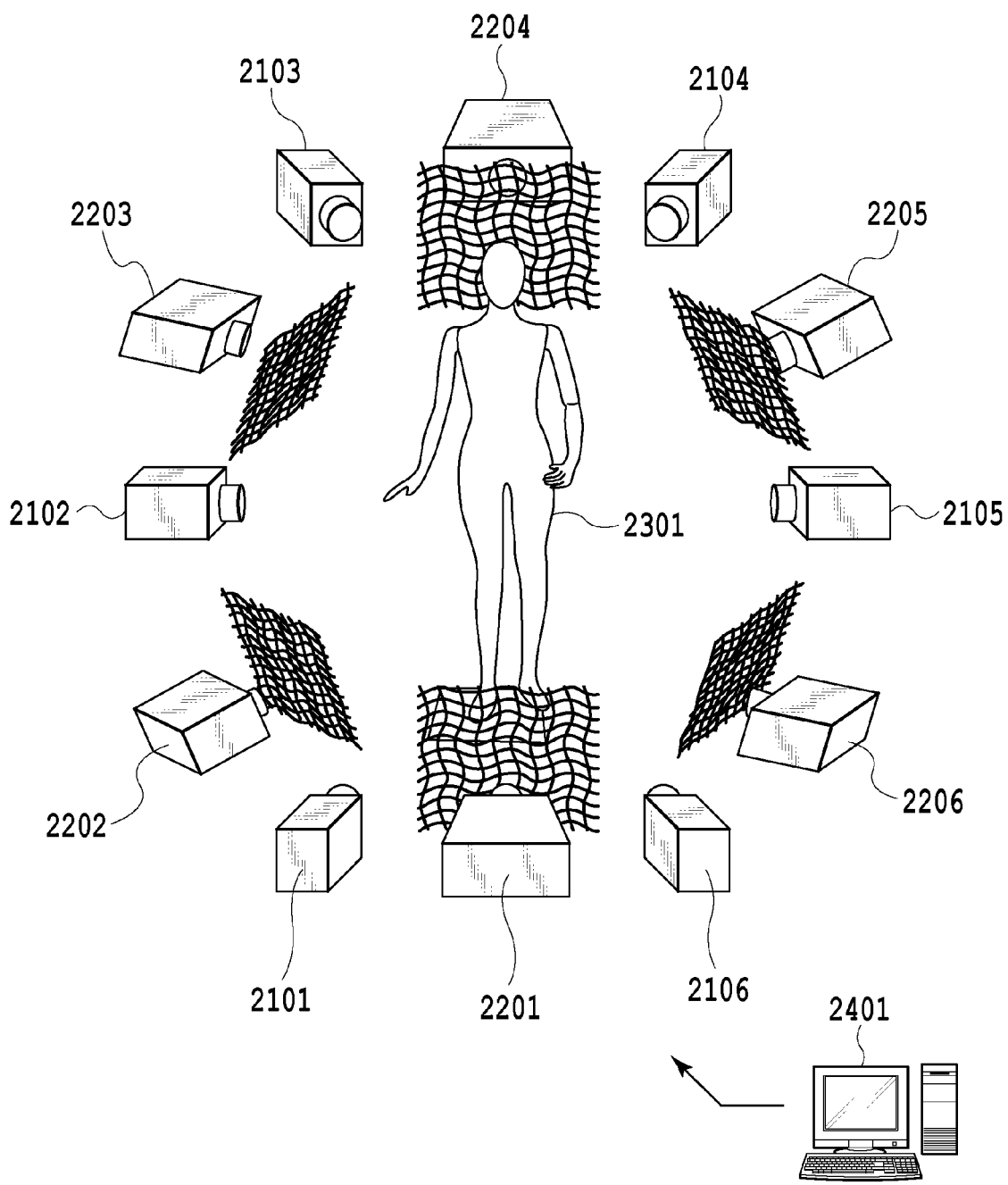
FIG. 10 is a diagram illustrating the configuration of an image processing system according to a third embodiment of the present invention.

An image processing system according to a third embodiment of the present invention is illustrated in FIG. 10. Six cameras 2101 to 2106 (imaging devices) and six projectors 2201 to 2206 (projection devices) are employed. The projectors 2201 to 2206 project, to an observation target 2301, grid patterns formed of wave lines. Since projected patterns are static patterns, synchronization with projection is not required. Therefore, measurement with a very high FPS (Frames Per Second) is enabled. The cameras 2101 to 2106 and the projectors 2201 to 2206 are connected to an image processing apparatus 2401 that includes a personal computer.

The image processing apparatus 2401 stores projected patterns, such as grid patterns formed of wave lines, in a storage medium in advance, and can transmit projected pattern data to the projectors 2201 to 2206 to project the patterns to the observation target 2301. Further, the image processing apparatus 2401 fetches input images captured by the cameras 2101 to 2106, stores the input images in the storage medium, and performs the image processing for shape reconstruction based on the input images.

In the third embodiment, since multiple patterns are included in images obtained by the cameras, it is required that a pattern should be examined to identify a projector that projected the pattern. Thus, colors are employed for identification of the projectors. In this case, patterns of the three primary colors of light, red, green and blue, are projected to an observation target respectively by the two projectors.

Figure 11A:
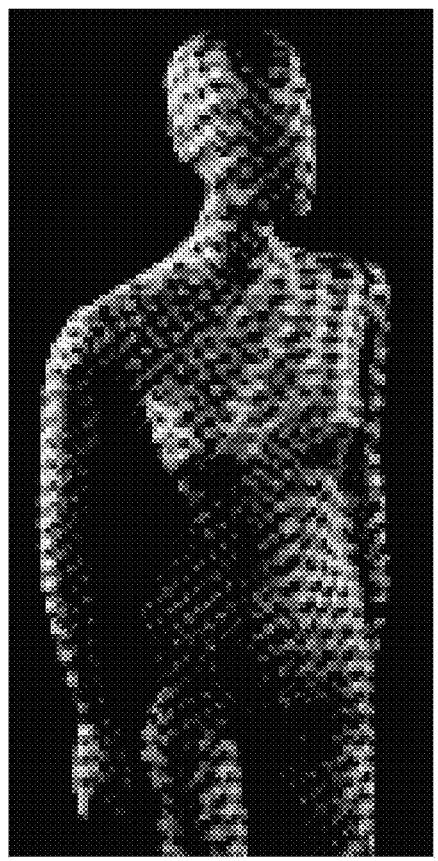
FIG. 11A is a diagram showing an image captured by projecting a grid pattern formed of wave lines of the three primary colors of light.
Figure 11B:
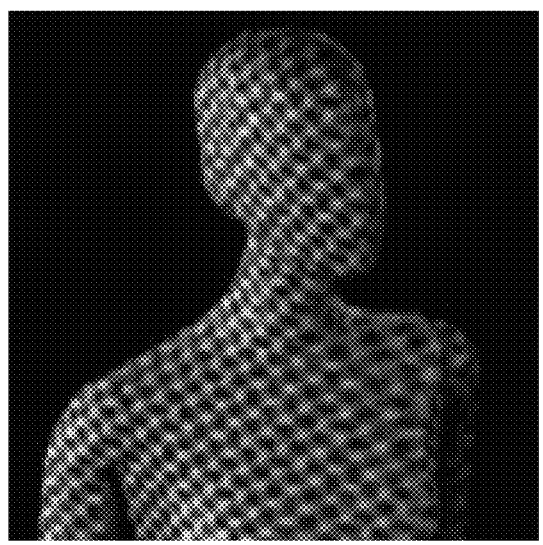
FIG. 11B is a diagram showing the results obtained by detecting a red pattern from the image shown in FIG. 11A.
Figure 11C:
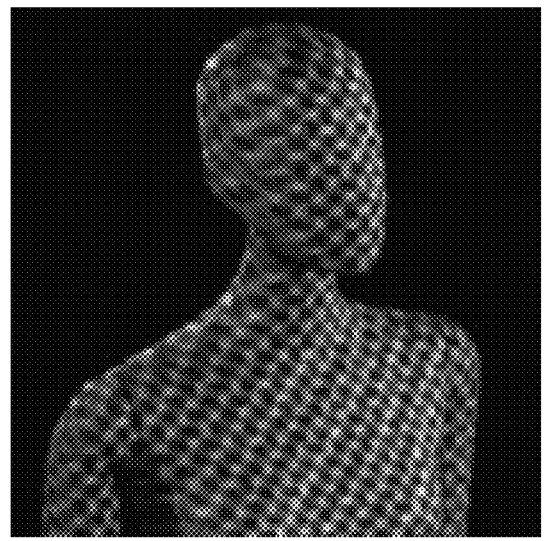
FIG. 11C is a diagram showing the results obtained by detecting a blue pattern from the image shown in FIG. 11A.
Figure 11D:
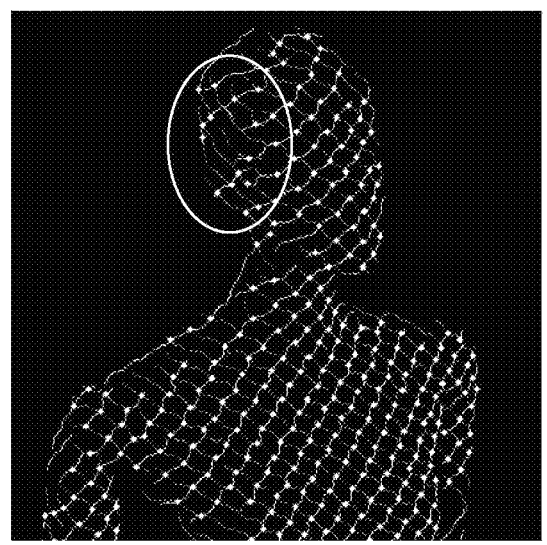
FIG. 11D is a diagram showing the results obtained by detecting a green pattern from the blue pattern.

An image obtained by projecting grid patterns of wave lines of the three primary colors is shown in FIG. 11A. The result obtained by extracting a red pattern from this image is shown in FIG. 11B, while the result obtained by detecting a blue pattern is shown in FIG. 11C. In this case, corresponding points are searched for without employing a green pattern. When line detection is performed by using the red pattern and the blue pattern, the obtained results are affected by the green pattern. At this time, as shown in FIG. 11D, a green pattern might be detected for the result of the blue pattern (on the side of the head in FIG. 11D). Therefore, before the line detection is performed, the colors are converted into saturated colors (pure colors) in the following manner.

$$(h,s,v)=RGB2HSV(r,g,b)$$

$$(r',g',b')=HSV2RGB(h,1,v) \quad (11)$$

Figure 11E:
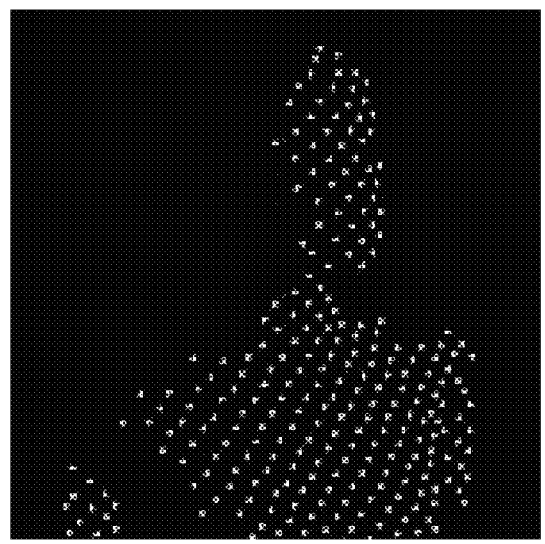
FIG. 11E is a diagram showing the results obtained by reducing the affect of a green pattern.

It should be noted that RGB2HSV and HSV2RGB represent conversion in the color space, and colors are represented in the range of [0, 1]. By conversion of the colors into saturated colors, the affect of the green pattern can be reduced, as shown in FIG. 11E.

A method for finding corresponding points for the red pattern and the blue pattern can be performed in the same manner as for the two-camera one-projector case in the second embodiment. Since more projectors are employed in the second embodiment, camera images are employed to detect points of correspondence between projectors.

Figure 12:
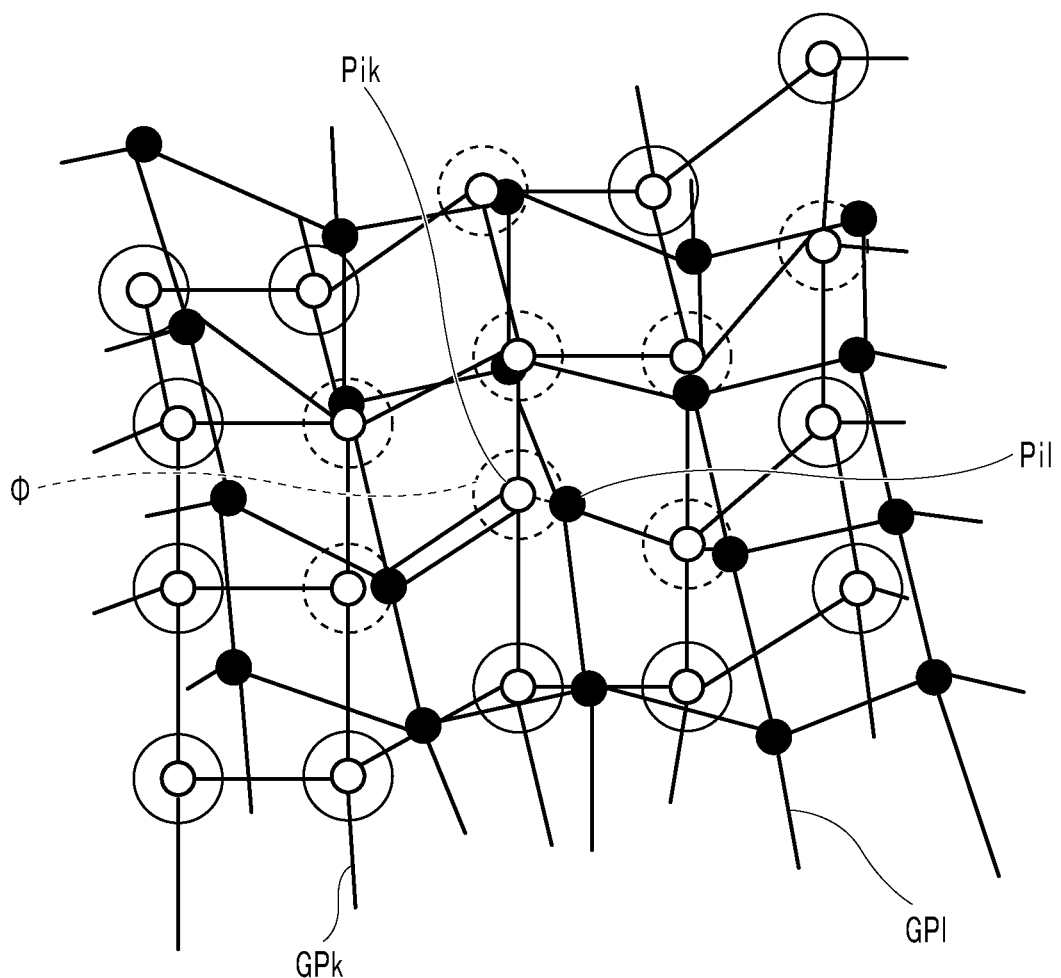
FIG. 12 is a diagram showing a camera image where a plurality of grid patterns overlap each other.

A camera image where a plurality of grid patterns are overlapped is shown in FIG. 12. When two grid points of different patterns, i.e., a pattern $GP_k$ of a projector k and a pattern $PG_l$ of a projector l, are projected on the same pixel of the camera, it means that the two points of projectors are associated with each other. These two points have the same depth from the camera. Since it is rare that two points are projected onto the exact same pixel, a point $p_{il} \in V_{il}$ of a camera i that corresponds to that for the projector l and that satisfies the following expression is searched for to determine a point $p_{ik} \in V_{ik}$ of the camera i that corresponds to that for the projector k.

$$D(p_{ik},p_{il})<\phi \quad (12)$$

At this time, D(a, b) is a distance between points a and b, and $\phi$ is the radius of a search area around $p_{ik}$.

As shown in FIG. 12, the corresponding points of two graphs are connected by a dotted line (a gap between the point $p_{ik}$ and the point $p_{il}$ in the drawing). The two graphs are combined into a single graph, and at the same time, assignment of the corresponding points is optimized by minimizing the energy. The energy of the edges of projector-projector correspondence is defined as follows:

[Ex. 10]

$$Z_{p_{ik}p_{il}}(t_{pik},t_{pil})=\tau|d_i(P_{3D}(t_{pik}))-d_i(P_{3D}(t_{pil}))| \quad (13)$$

It should be noted that $d_i(P_{3D})$ is the depth of the coordinate point $P_{3D}$ of the camera i, and $\tau$ is a user-defined weight. The total energy with multiple cameras and projectors is defined by the following equation:

[Ex. 11]

$$E(T) = \sum_i \sum_{k \in A_p(i)} E(T_{ik}) + \qquad (14)$$

$$\sum_k \sum_{i \in A_c(k), j \in A_c(k)} \left( \sum_{(p_{ik},p_{jk}) \in S_{ijk}} X_{p_{ik}p_{jk}}(t_{pik},t_{pjk}) \right) +$$

$$\sum_i \sum_{k \in A_p(i), l \in A_p(i)} \left( \sum_{(p_{ik},p_{il}) \in Q_{ikl}} Z_{p_{ik}p_{il}}(t_{pik},t_{pil}) \right)$$

It should be noted that $A_p(i)$ is a set of projectors that share the field of view with the camera i, $A_c(k)$ is a set of cameras that share the field of view with the projector k. $S_{ijk}$ is a set of edges between the cameras i and j given by the pattern of the projector k. $Q_{ikl}$ is a set of edges between the projectors k and l in the image of the camera i.

To increase the density of an image, a method described while referring to FIG. 9 for the second embodiment can be employed.

Next, optimization for the image in the entire range is performed by minimizing the energy. In the second embodiment, the energy consists of the data term and regularization term. The data term is calculated based on the difference of intensities between the camera and the projector, and the regularization term is defined by using the curvature around each vertex of the grid graph. When images in two ranges are superimposed with each other, the shapes are matched, and the depths of the images are optimized by employing the additional constraint.

Figure 13:
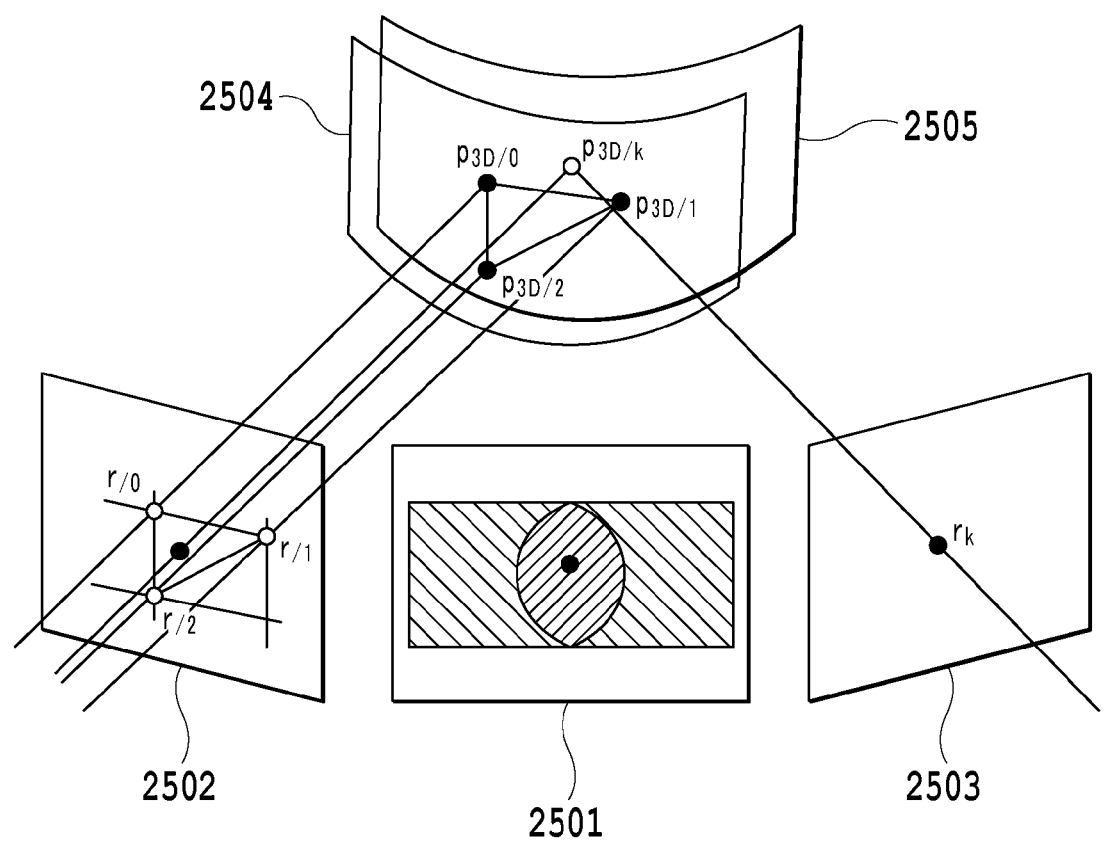
FIG. 13 is a diagram showing the state wherein images obtained in the two ranges of two projectors are superimposed with each other.

The state wherein the images in two ranges of two projectors are superimposed with each other is shown in FIG. 13. A coordinate point $P_{3Dk}$ is calculated from a point $r_k$ of the projector k (2503). The point $r_k$ overlaps the projector l (2502) when the projection point of $p_{3Dk}$ is located on the mask of the camera (2501). When the coordinate point $p_{3Dk}$ is projected onto the image of the projector l, and is found inside a triangle formed of three points, $r_{10}$, $r_{11}$ and $r_{12}$, these points are regarded as the corresponding points.

When the depth at a point r is $d_r$, and a small change of $d_r$ is $\Delta d_r$, iterative minimization is performed by employing $\Delta d_r$ to update the depth. The energy is defined by using $\Delta d_r$ as follows:

[Ex. 12]

$$E(\Delta D) = \sum_k E_I + \alpha \sum_k E_S + \beta \sum_i \sum_{k,l \in A_p(i)} E_p \qquad (15)$$

$$E_p = \sum_{r_k} \sum_{r_{ln} \in G(r_k)} (P_{3Dk}(\Delta d_{rk}) - P_{3Dln}(\Delta d_{rln})^2$$

It should be noted that $\Delta D$ is a set of $\Delta d_r$, and $E_I$ is a data term, while $E_S$ is a regularization term. $E_P$ represents the constraint between images in two ranges. $G(r_k)$ is a function to find the corresponding point $r_{ln}$ of a point $r_k$. $P_{3D}(\Delta d_r)$ represents that the coordinate point has been moved at a distance $\Delta d_r$ along the line of sight. $d_r$ for each pixel is iteratively updated by adding $\Delta d_r$ that minimizes an error $E(\Delta D)$ in a non-linear minimization manner.

According to the third embodiment, a case wherein, for example, six cameras and six projectors are alternately arranged on a circumference has been considered. Since one camera is located on each side of a single projector, six combinations are available as a set of two cameras and one projector, described in the second embodiment. When the colors of patterns projected by the individual projectors are selected as, for example, RGBRGB to avoid the same colors adjacent to each other, two different patterns are projected to one camera by the two projectors located on the respective sides. Therefore, the combination of two colors, RG, GB or BR, is identified by the above described method.

As a conclusion of the above embodiments, correspondence is searched for by additionally employing the camera-projector information in the first embodiment, the camera-camera information in the second embodiment, or the projector-projector information in the third embodiment.

Fourth Embodiment

In the first to the third embodiments, the matching cost has been obtained as the SSD between a camera image and a projector image (pattern image). Since a simple SSD with respect to a quadrilateral area is not appropriate as a data term, a patch obtained by approximating the area around the grid point of a target object to the tangent plane of the grid point has been employed. In a fourth embodiment of this invention, results obtained by line detection are to be compared, instead of comparison of the images.

Figure 14:
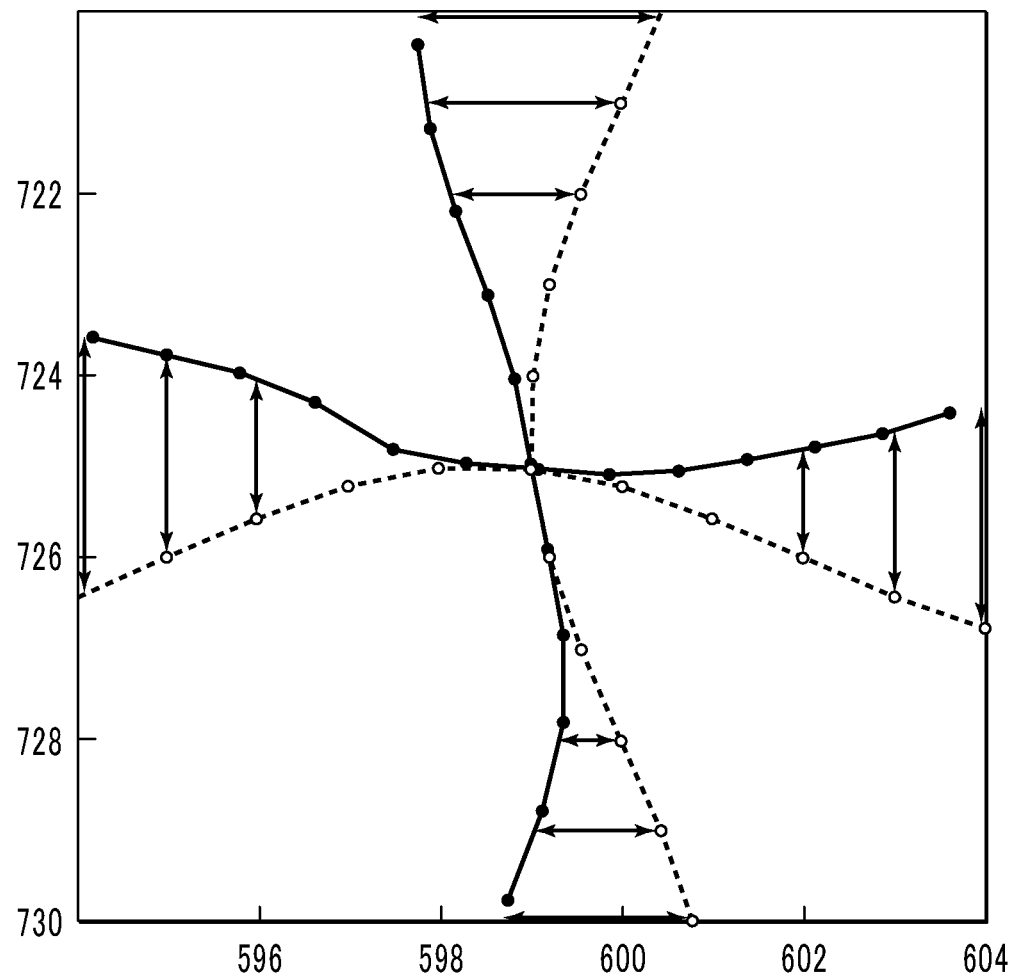
FIG. 14 is a diagram for explaining another embodiment for an intersection comparison method.

Another example for the intersection comparison method will be described while referring to FIG. 14. As a result of line detection, a local line detection error (called a line feature) around an intersection point is employed. The solid line in FIG. 14 indicates the result of line detection, and a broken line indicates a projector's pattern, which is employed as a cost to be provided for the BP for calculation of the sum (=an error) of differences at the individual positions. In a case wherein an error is small, this represents that a possibility that the grid points are associated with each other is high. According to this method, the amount of calculation can be reduced, compared with the amount of calculation for the SDD described in the first embodiment.

Further, the camera image and the projector image are directly compared with each other for the calculation of the SSD, and therefore, when an object has a texture, the camera image might be adversely affected by the texture. That is, the intensity of an image is changed by the texture, and a difference between the comparison results is increased. In contrast, in case of line detection, the positions of the detected lines are compared, instead of comparing the images, and therefore, the result is not affected by the change of the intensity of the image. Thus, the affect due to the reflectivity of the object can be reduced.

Fifth Embodiment

As described while referring to FIGS. 3A and 3B, the parameter for the pattern to be projected has been determined empirically. Therefore, a pattern for providing the best shape measurement results is predicted to determine a parameter.

Figure 15A:
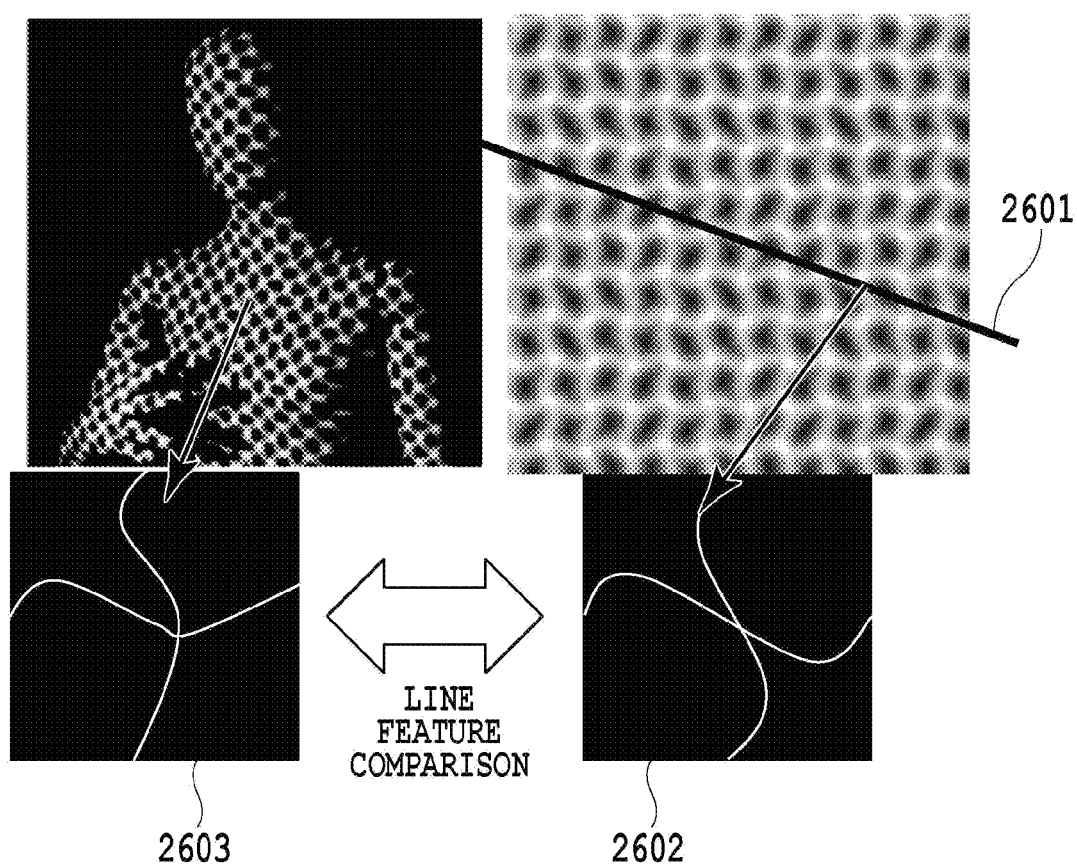
FIG. 15A is a diagram for explaining a parameter determination method for a grid pattern formed of wave lines.
Figure 15B:
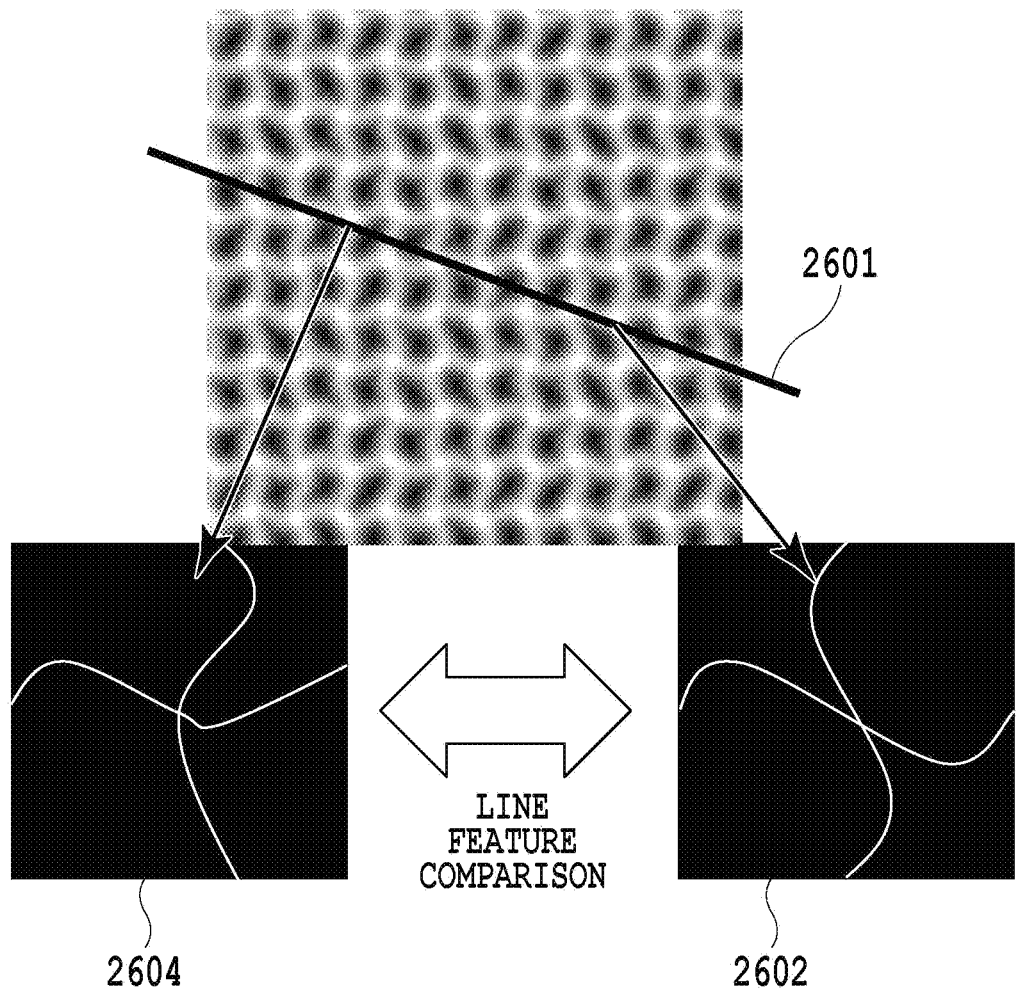
FIG. 15B is a diagram for explaining the parameter determination method for a grid pattern formed of wave lines.

As shown in FIG. 15A, according to the stereo matching, a corresponding point 2602 of a projector image associated with a grid point 2603 of a specific camera image is present along an epipolar line (linear line) 2601. There is a possibility that the intersection points on the same epipolar line might be incorrect candidates of correspondence (incorrect correspondence) (for example, intersection points 2602 and 2604 in FIG. 15B). Therefore, the comparison of the SSDs or the line features described in the fourth embodiment is performed for the intersection points on the same epipolar line. The parameter should be selected to obtain as a large difference as possible. Since comparison is performed for data, including information for the adjacent intersection points, the energy represented in expression 2 is repetitively calculated by the BP method. Of the incorrect correspondences for the individual intersection points, the correspondence for which the energy calculated by the BP is smallest is regarded as the evaluation value for the pertinent intersection point, and calculation of the evaluation value is performed by taking all of the intersection points into account. The parameter for which the total evaluation value is the smallest is determined to be the optimal parameter.

The degrees of similarity are compared for two arbitrary intersection points on the same epipolar line, and a parameter is selected to obtain the smallest degree of similarity. The average of the evaluation values of all of the intersection points is employed as the total evaluation value; however, the average evaluation value obtained by taking only arbitrary intersection points into account, or the smallest or largest value of the evaluation values for all of the intersection points, may also be employed as the total evaluation value. The parameters for which the smallest evaluation values are obtained are determined to be the optimal parameters.

For determining the optimal parameter, only the projector image is employed to compare the intersection points on the epipolar line of the projector image. Assuming that the camera and the projector have been calibrated, when the parameter of the grid pattern is changed, the epipolar line is unchanged, while the intersection points on the same epipolar line are changed. Thus, the parameter for which the evaluation value obtained by calculation using the intersection points on the same epipolar line is the smallest should be selected.

The intervals of the wave lines, the wavelengths of the wave lines, or the amplitudes of the wave lines are changed as the parameters of the grid pattern, or the pattern is rotated, and in every case, the energy is calculated to determine, as an optimal parameter, the parameter for which the total evaluation value is the smallest. It should be noted that the thicknesses or the colors (wavelengths) of the wave lines may also be included in the parameter.

Example 1

Figure 16A:
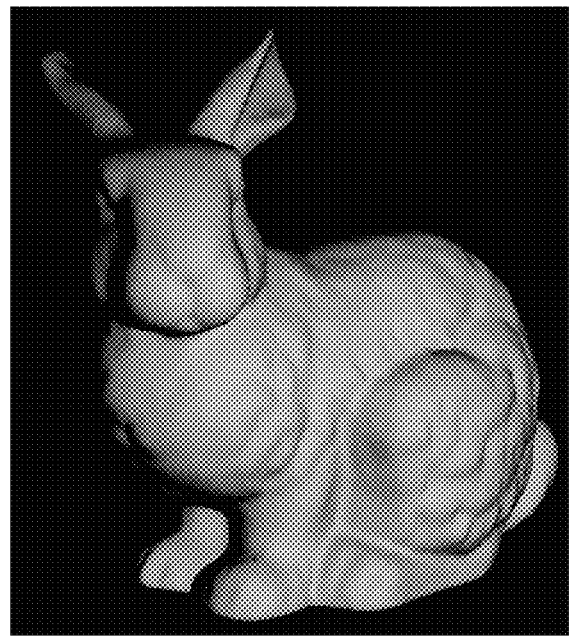
FIG. 16A is a diagram showing the simulation results obtained for the first embodiment.
Figure 16B:
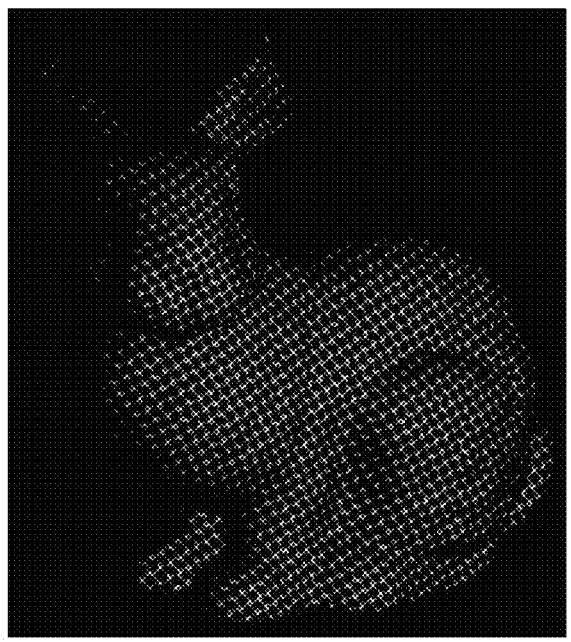
FIG. 16B is a diagram showing the simulation results obtained for the first embodiment.
Figure 16C:
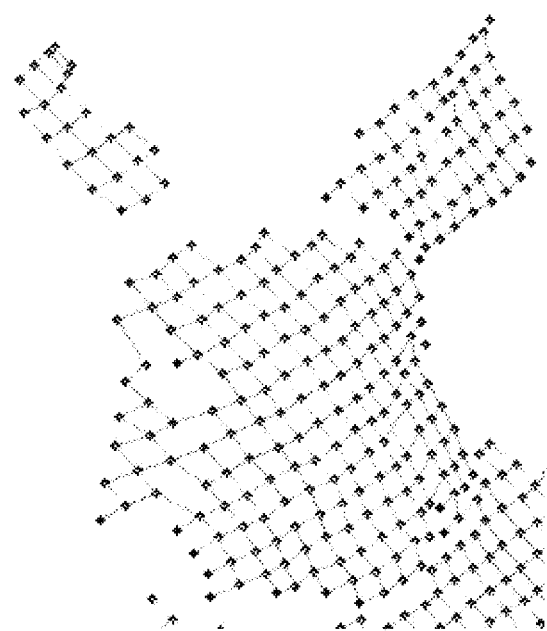
FIG. 16C is a diagram showing the simulation results obtained for the first embodiment.
Figure 17A:
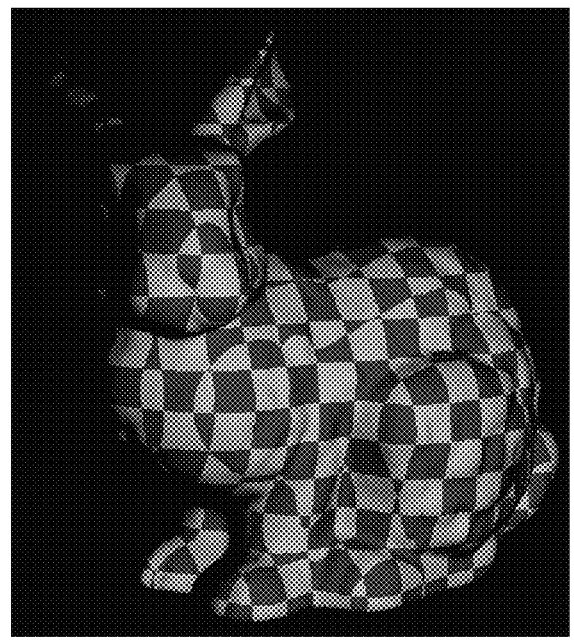
FIG. 17A is a diagram showing the simulation results obtained for the first embodiment.
Figure 17B:
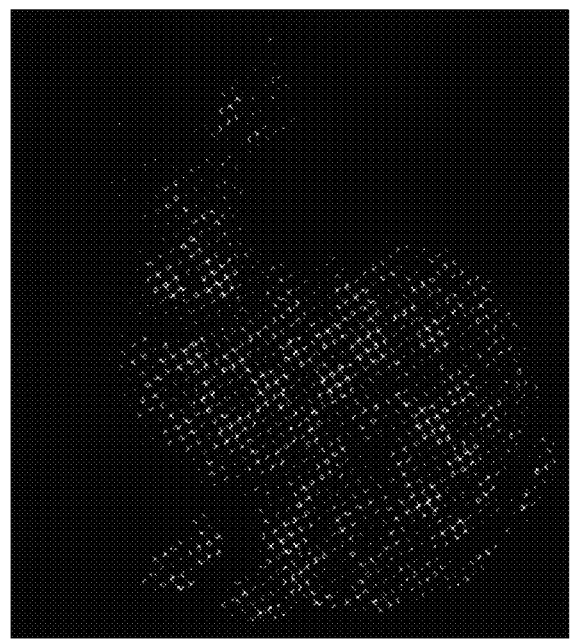
FIG. 17B is a diagram showing the simulation results obtained for the first embodiment.
Figure 17C:
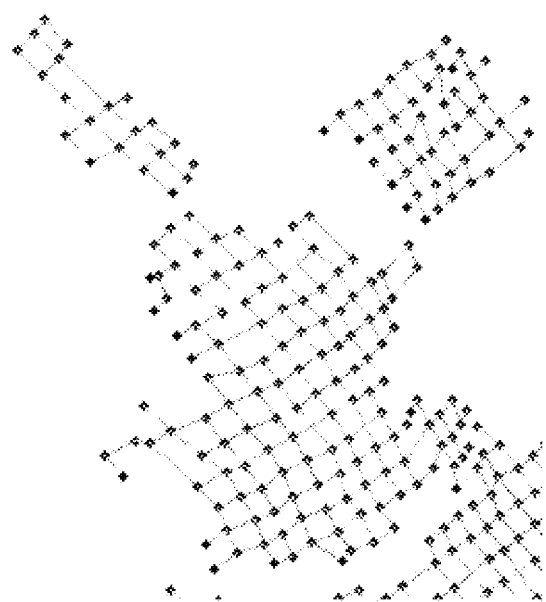
FIG. 17C is a diagram showing the simulation results obtained for the first embodiment.

The simulation result in the first embodiment is shown in FIGS. 17 and 18. In this case, the bunny data in shape database of Stanford University (NPL 21) is employed as a target shape. An image of an observation target having no texture is shown in FIG. 16A, while an image where a grid pattern is mapped is shown in FIG. 17A. The images generated based on these input images by ray-tracing software described in NPL 22 are shown in FIGS. 16B and 17B, respectively. The grid detection result for the head in the first embodiment is shown in FIGS. 16C and 17C. The continuity of grids for some portions on the boundaries between the head, the ears and the body are incorrectly detected, but these portions were successfully disconnected at the stereo matching process.

Figure 18A:
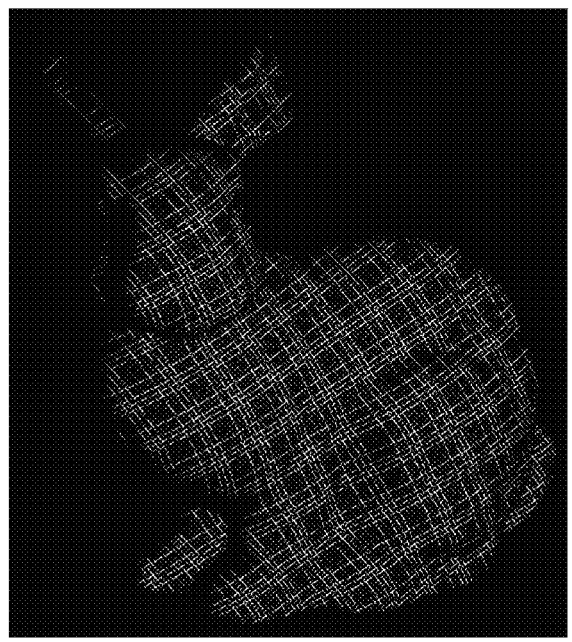
FIG. 18A is a diagram showing the simulation results obtained by using a method for prior art.
Figure 18B:
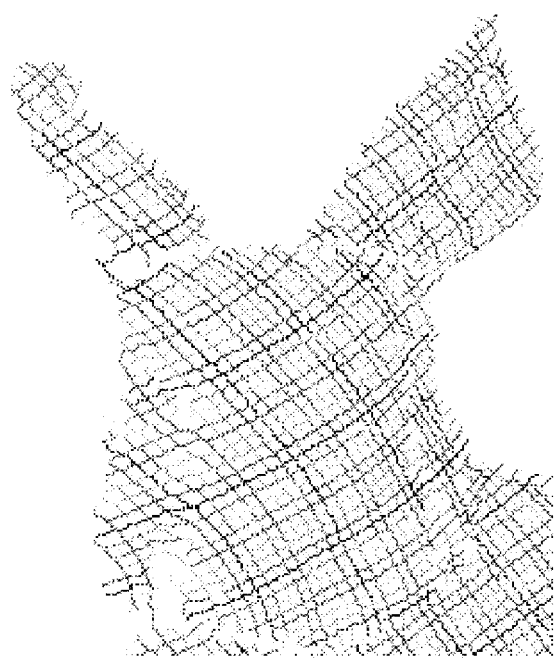
FIG. 18B is a diagram showing the simulation results obtained by using the method for the prior art.
Figure 19A:
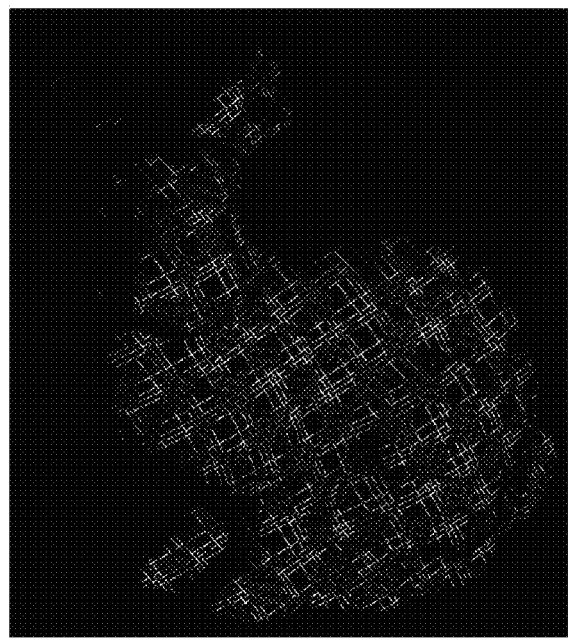
FIG. 19A is a diagram showing the simulation results obtained by using a method for prior art.
Figure 19B:
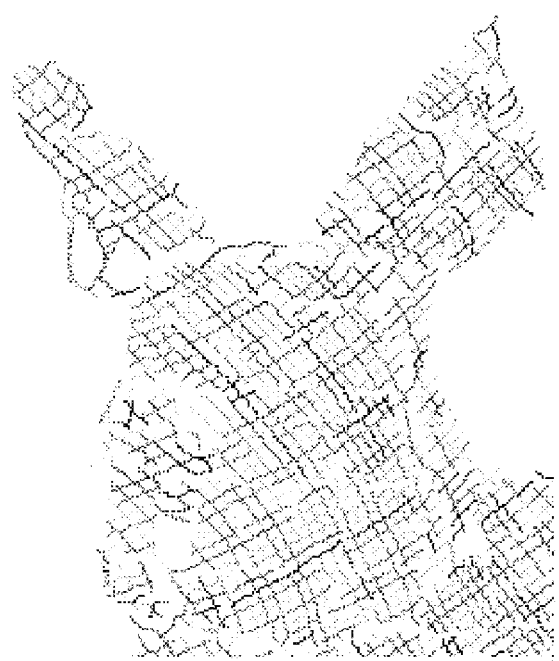
FIG. 19B is a diagram showing the simulation results obtained by using the method for the prior art.

An input image obtained by a method, described in NPL 8, that employs two colors is shown in FIG. 18A, and is a textureless image to be observed. A textured image to be observed is shown in FIG. 19A. For these images, local ID information of eight cycles are encoded by using three two-colored lines. With this method, the successful result is obtained as shown in FIG. 18B in a case wherein a textureless object is employed. However, when an object has texture, the color information for the pattern is deteriorated, and decoding of ID information and 3D reconstruction are not successful, as shown in FIG. 19B.

Figure 20A:
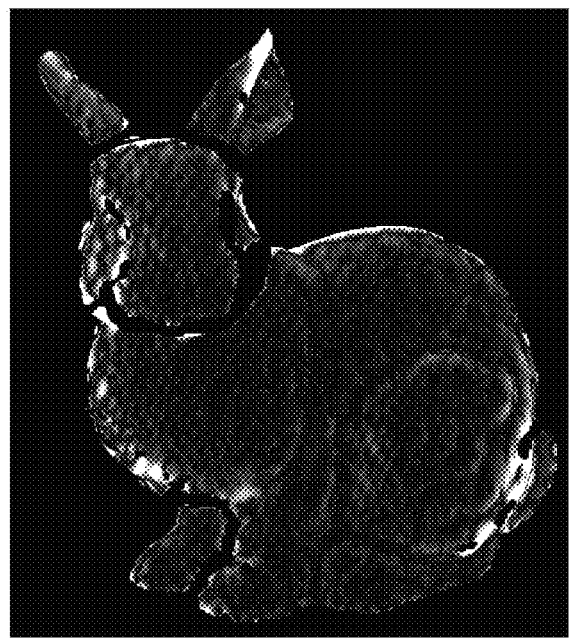
FIG. 20A is a diagram showing an image representing an error between a reconstruction result obtained by entering the image in FIG. 16B and a true value.
Figure 20B:
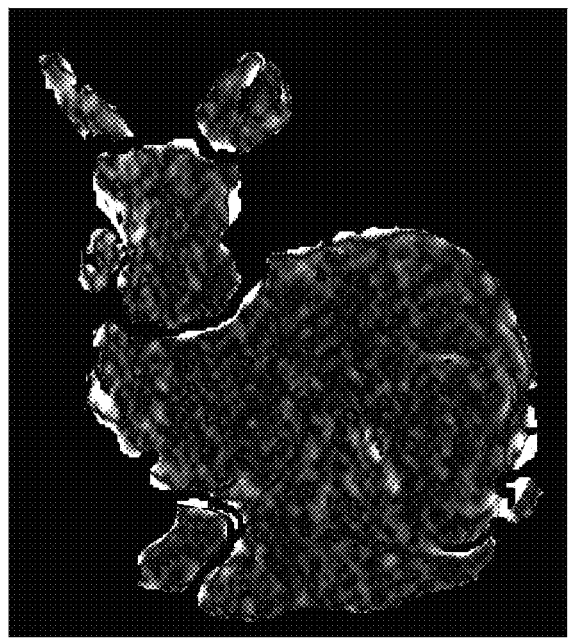
FIG. 20B is a diagram showing an image representing an error between a reconstruction result obtained by entering the image in FIG. 17B and a true value.
Figure 20C:
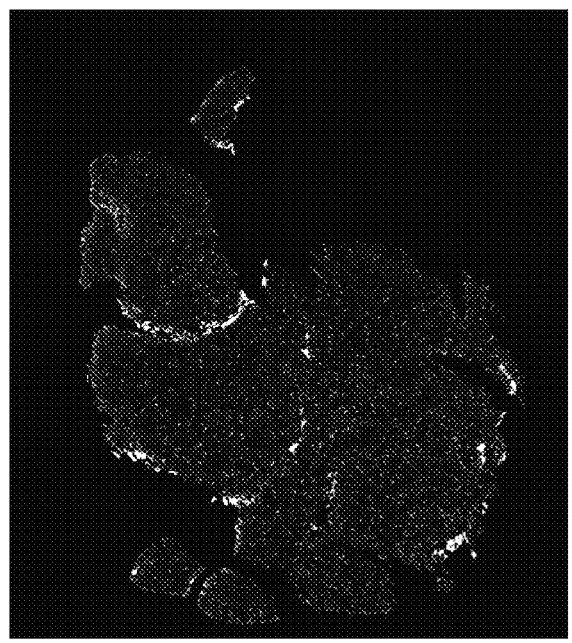
FIG. 20C is a diagram showing an image representing an error between a reconstruction result obtained by entering the image in FIG. 18A and a true value.

Correspondence errors for FIG. 16B, FIG. 17B and FIG. 18A were calculated in order to perform quantitative evaluation for the above described experiment. Since the coordinates of the projector image associated with the individual pixels of the camera image are already known, an error between the corresponding point, estimated based on the reconstruction result, and the actual corresponding point is calculated by using the distance on the image plane. The errors for FIG. 16B, FIG. 17B and FIG. 18A are indicated as images, in the named order, in FIG. 20C. A bright pixel indicates that the error is great.

The root-mean-square error (RMSE) for each pixel is shown in a table below:

TABLE 1

| Evaluation Method | Input Image | RMSE 1 | RMSE 2 |
|---|---|---|---|
| First Embodiment | FIG. 16B | 0.3957 | 0.2964 |
|  | FIG. 17B | 0.6245 | 0.4210 |
| Method in NPL 8 | FIG. 18A | 0.6286 | 0.2356 |

The RMSE values are RMSE1, obtained by calculation for all of the corresponding points that have been reconstructed, and RMSE2 obtained by calculation for the corresponding points, other than outliers that are beyond one pixel. It is apparent from this table that, in case of no texture, better RMSE1 is obtained for all of the pixels by the method in the first embodiment than by the method in NPL 8, while better RMSE2 for which the outliers are removed is obtained by the method in NPL 8 than by the method in the first embodiment.

The probable reason for this is as follows. Since according to the method in NPL 8, the corresponding points are calculated based on the local ID (phase) of the line pattern that appears locally, the accuracy is high so long as the local ID information is correctly obtained. However, when decoding of the local ID is not successful, a large error occurs. This error is observed as salt-and-pepper noise in FIG. 20C. Further, in case of a design pattern that is mapped, reconstruction is not successfully performed by the method in NPL 8, while although an error is increased a little, shape reconstruction is successfully performed by the method in the first embodiment. Therefore, it can be said that the method in the first embodiment provides higher robustness and accuracy than the method in NPL 8, especially in case of a textured object.

Figure 21A:
FIG. 21A is a diagram showing a polygon mesh associated with the input image in FIG. 16B that has been reconstructed in the first embodiment.
Figure 21B:
FIG. 21B is a diagram showing a polygon mesh associated with the input image in FIG. 17B that has been reconstructed in the first embodiment.

Polygon meshes reconstructed in the first embodiment are shown in FIGS. 21A and 21B. The polygon mesh in FIG. 21A corresponds to the input image in FIG. 17A, and the polygon mesh corresponds to the input image in FIG. 17B. The shapes shown in FIGS. 21A and 21B represent the dense reconstruction results by performing interpolation. In the conditions employed for the experiment, the base line between the camera and the projector is long, and a parallax error of about 100 pixels, for example, is present; however, correct correspondence is obtained through the stereo reconstruction, without the search range being designated. Furthermore, dense corresponding points can be obtained by performing interpolation and optimization.

Example 2

The results obtained through the experiment based on real data will be described. A camera of 1600×1200 pixels and a projector of 1024×768 pixels were employed. The image sequences were captured at 30FPS, and a PC equipped with Intel Core i7 2.93 GHz and NVIDIA GeForce 580GTX was used. The above described algorithms were implemented by CUDA (Compute Unified Device Architecture). Line detection was implemented as a single thread on a CPU. First, in order to demonstrate the effectiveness of a grid pattern of wave lines, comparison of the grid pattern of wave lines with a linear line pattern was performed.

Figure 22A:
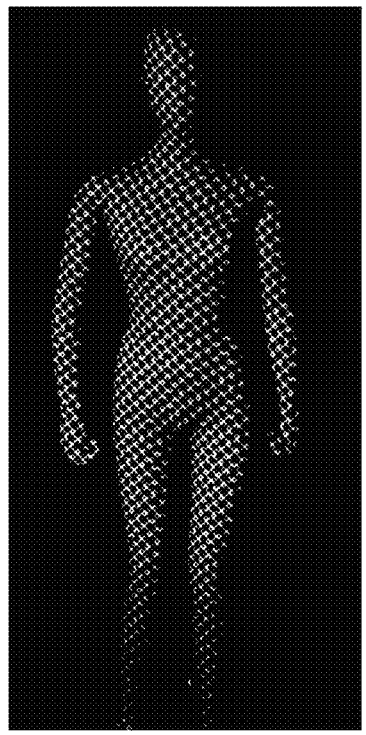
FIG. 22A is a diagram showing an input image that represents the result obtained by reconstruction using a grid pattern formed of wave lines.
Figure 22B:
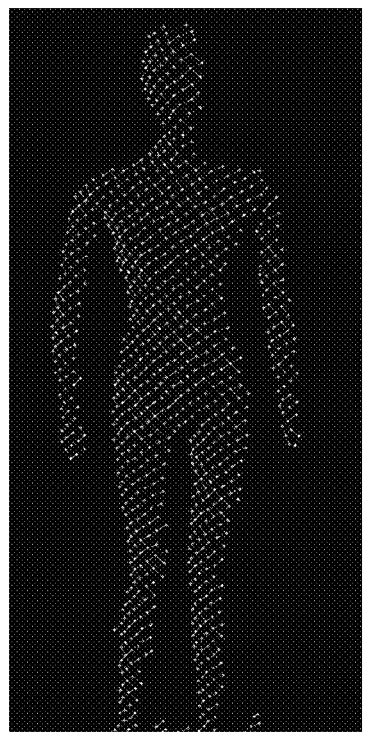
FIG. 22B is a diagram showing the result obtained by reconstructing an input image using a stereo matching method.

The result of reconstruction based on the grid pattern of wave lines is shown in FIGS. 22A to 22D. This is a 3D reconstruction result provided by using the wave pattern in FIG. 3B. An input image is shown in FIG. 22A, and the reconstruction result obtained by the projector-camera stereo matching method is shown in FIG. 22B. The grid lines at the discontinuous portion of an object (the boundary between the head and the neck of the mannequin) were successfully disconnected at the stereo matching process.

Figure 22C:
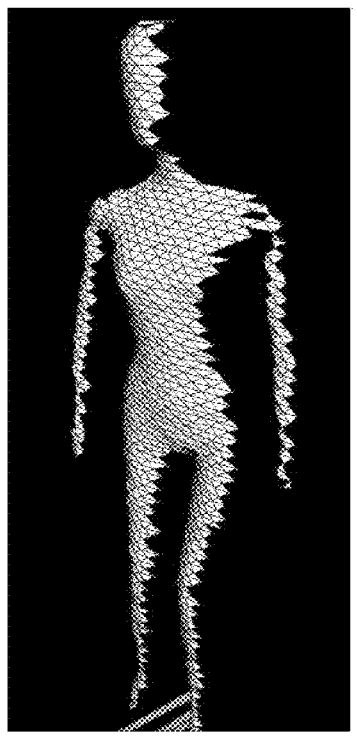
FIG. 22C is a diagram showing the result obtained by reconstruction in the first embodiment.

The result of 3D reconstruction for this embodiment is shown in FIG. 22C. The number of the grid points was 943 and the average number of candidates of corresponding point for each grid point was 41. The computational time for the stereo matching process was 0.22 seconds. Although the entire image was designated as the search range, the computational cost was still low because the grid pattern was sparse, compared with the number of pixels.

Figure 22D:
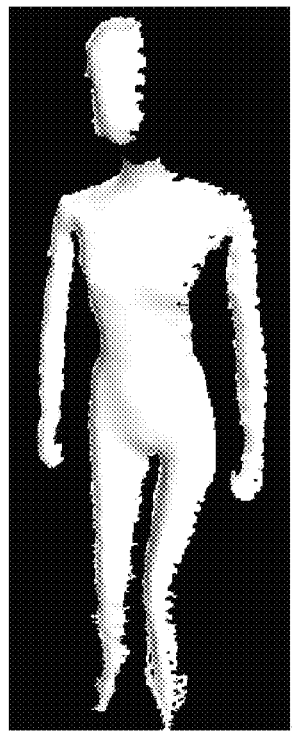
FIG. 22D is a diagram showing a dense shape pattern generated by an interpolation method.
Figure 23A:
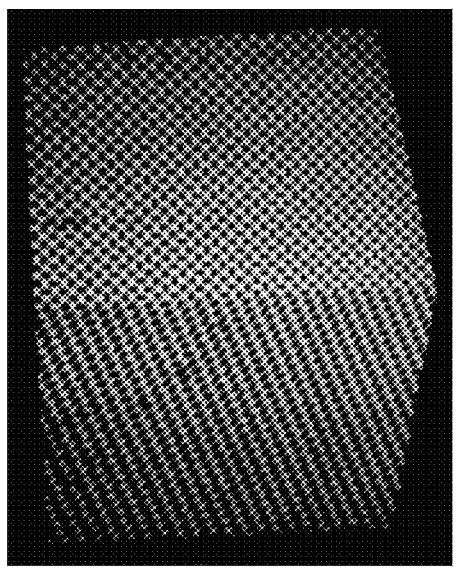
FIG. 23A is a diagram showing an input image that represents the result obtained by evaluating the accuracy in the first embodiment.
Figure 23B:
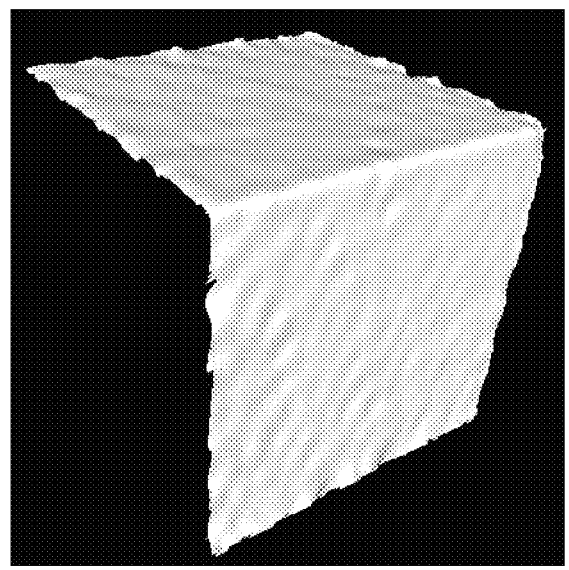
FIG. 23B is a diagram showing the shape pattern generated from the input image in FIG. 23A by the interpolation method.
Figure 23C:
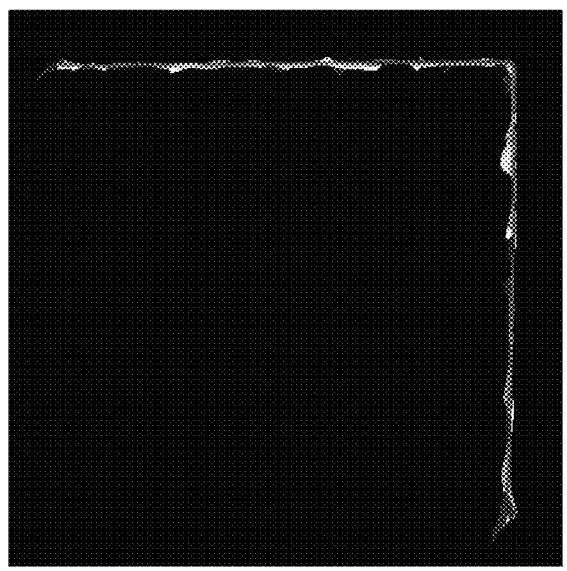
FIG. 23C is a diagram imaging an error of FIG. 23A.

A dense shape generated by the above described method is shown in FIG. 22D. The number of vertices of the 3D model was 25,938. The number of iteration for optimization was five, and the computational time for interpolation was 0.59 seconds. The total time including line detection was 4.87 seconds. The result obtained by evaluating the accuracy in the first embodiment is shown in FIGS. 23A to 23C. An input image is shown in FIG. 23A, a shape generated by the above described interpolation method is shown in FIG. 23B, and an error represented by using an image is shown in FIG. 23C. Evaluation was performed by measuring the shape of a cube. The size of the cube was 0.2 m square and the distance from the camera was about 1.0 m. A plane was fit to each face of the reconstructed cube to calculate RMSE for an error from each plane. The average of RMSE of two planes was 0.36 mm, and an angle between the planes was 88.8 degrees (correctly, 90.0 degrees). This error is regarded as extremely small for practical use.

Figure 24A:
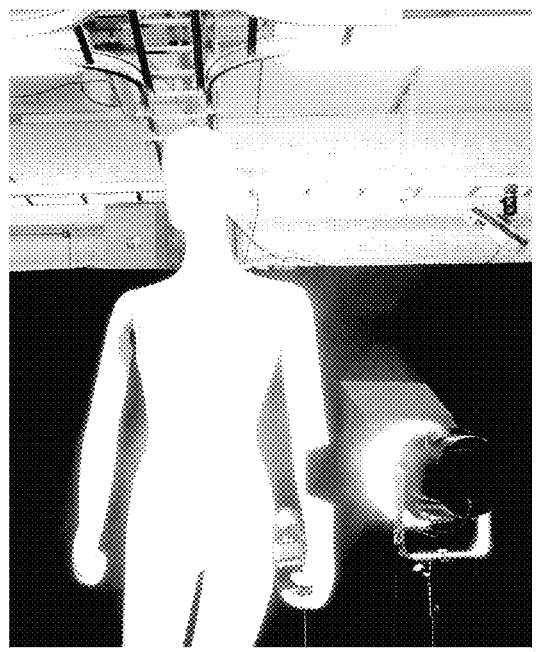
FIG. 24A is a diagram showing an experiment environment to represent the result obtained by reconstruction under the effect of ambient light.
Figure 24B:
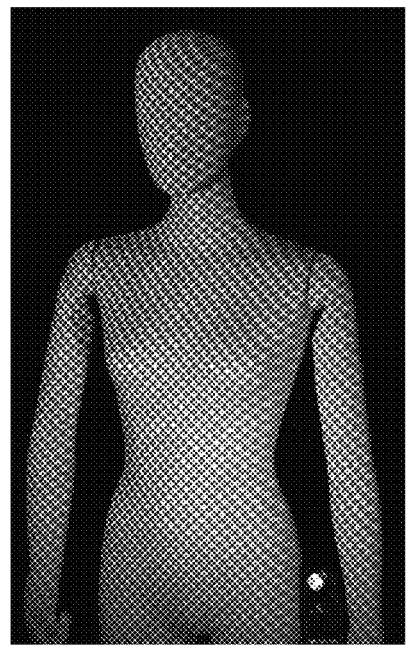
FIG. 24B is a diagram showing the effects provided by a bandpass filter.
Figure 24C:
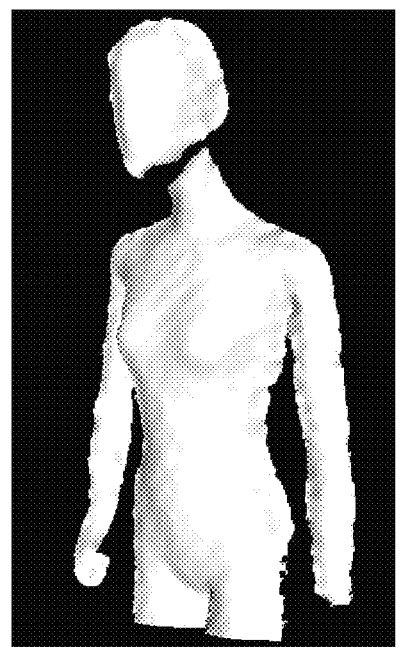
FIG. 24C is a diagram showing the results obtained by 3D reconstruction in the first embodiment.

FIGS. 24A to 24C are diagrams showing the result obtained by reconstruction under the affect of ambient light. The important advantage of a single-colored static pattern can be the increase of choices for a device to irradiate a pattern. Therefore, a reconstruction experiment using a laser projector that projects light of a single wavelength was conducted. Since the energy of projected light concentrated on a small bandwidth, even under the affect of the environmental light, a projected pattern could be observed by using an appropriate bandpass filter. The experiment environment is shown in FIG. 24A, and it is apparent that a target is strongly irradiated by an external light source. However, as shown in FIG. 24B, a projected pattern is clearly identified by a bandpass filter, and as shown in FIG. 24C, correct 3D reconstruction can be performed.

Figure 25:
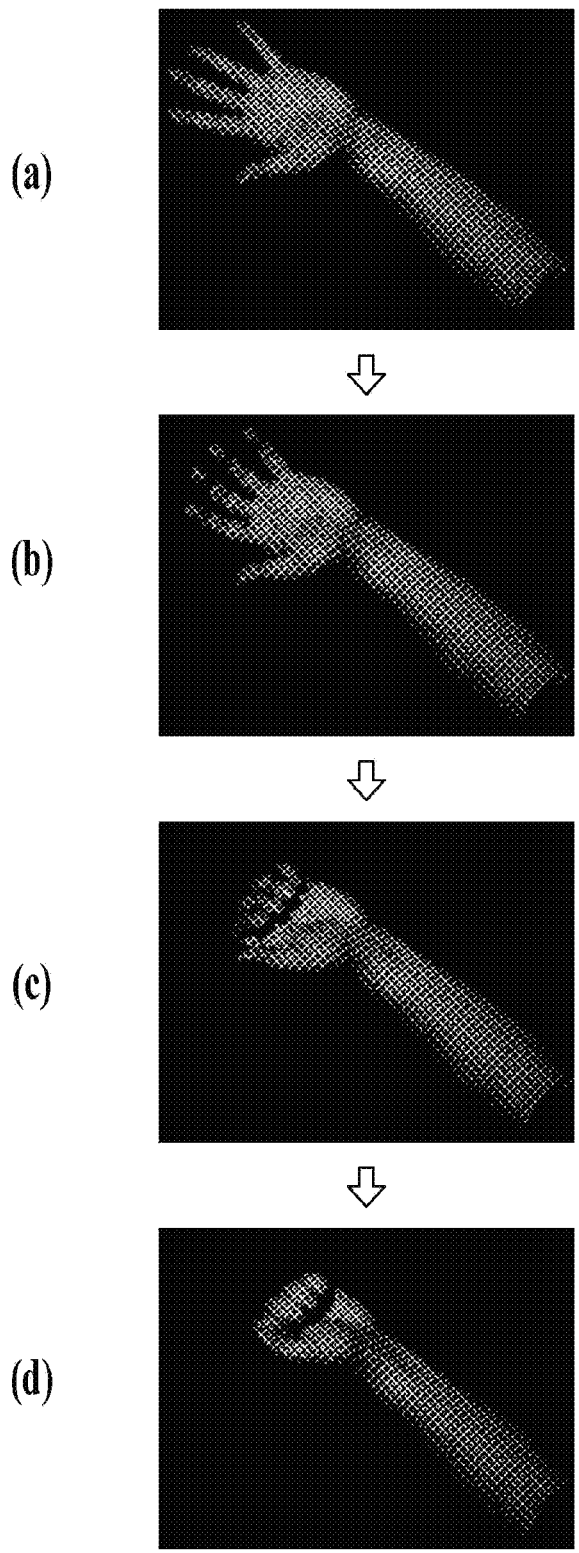
FIG. 25 is a diagram showing a first example for an input image to capture the opening and closing movement of a hand.
Figure 26:
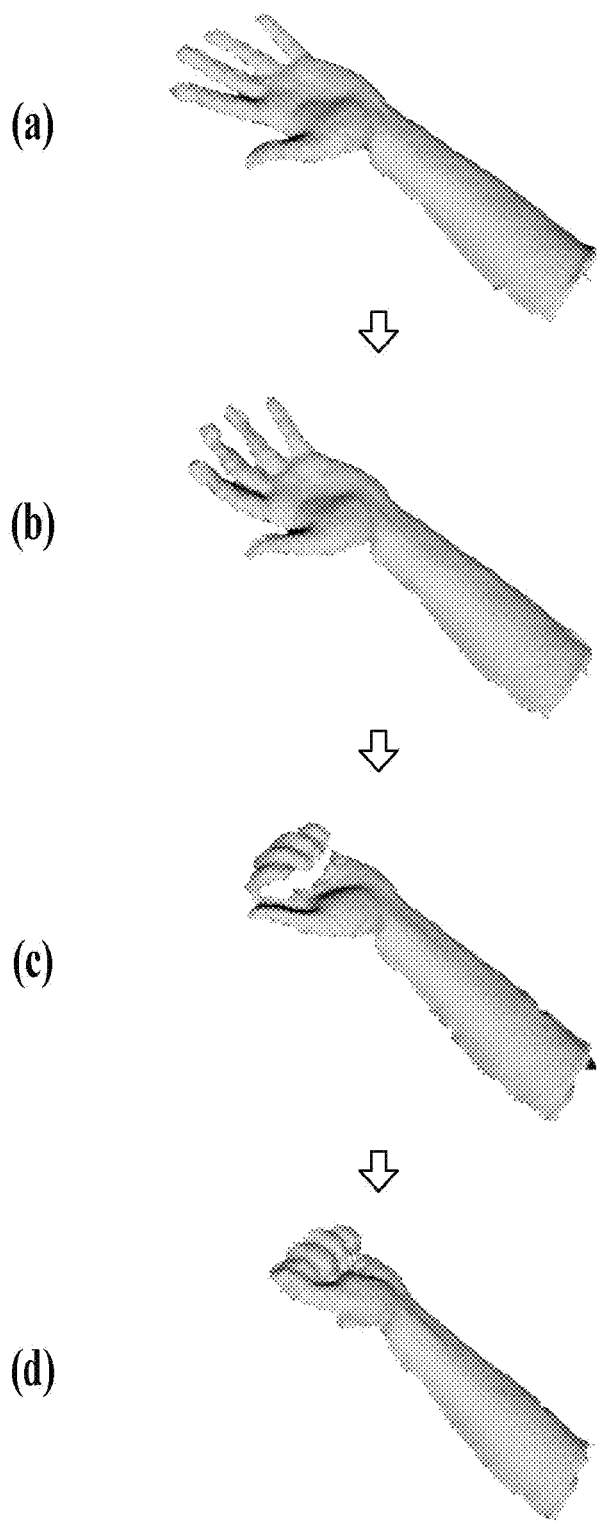
FIG. 26 is a diagram showing a first example for the result obtained by capturing the opening and closing movement of the hand.

The result for capturing the opening and closing movement of a hand is shown in FIGS. 25 and 26. The movement for closing the hand was measured in the order of FIGS. 25A to 25D. The measurement results for these movements are shown in FIGS. 26A to 26D. According to the first embodiment, since one-shot reconstruction is performed, 3D reconstruction of the target object can be performed for each independent frame even when the target object moves fast.

Figure 27:
FIG. 27 is a diagram showing a second example for the measurement result of an object in motion.
Figure 27:
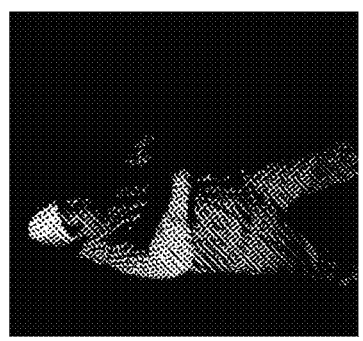
Figure 27:
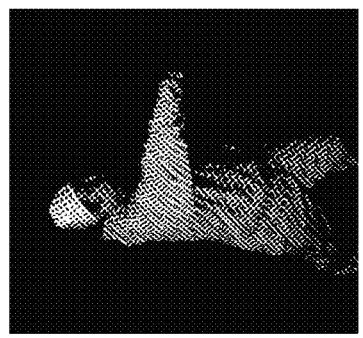
Figure 27:
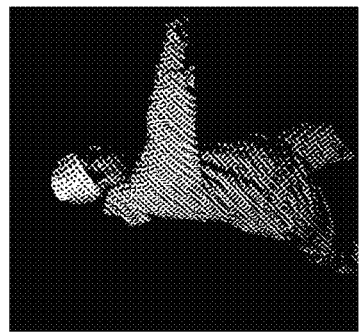
Figure 28:
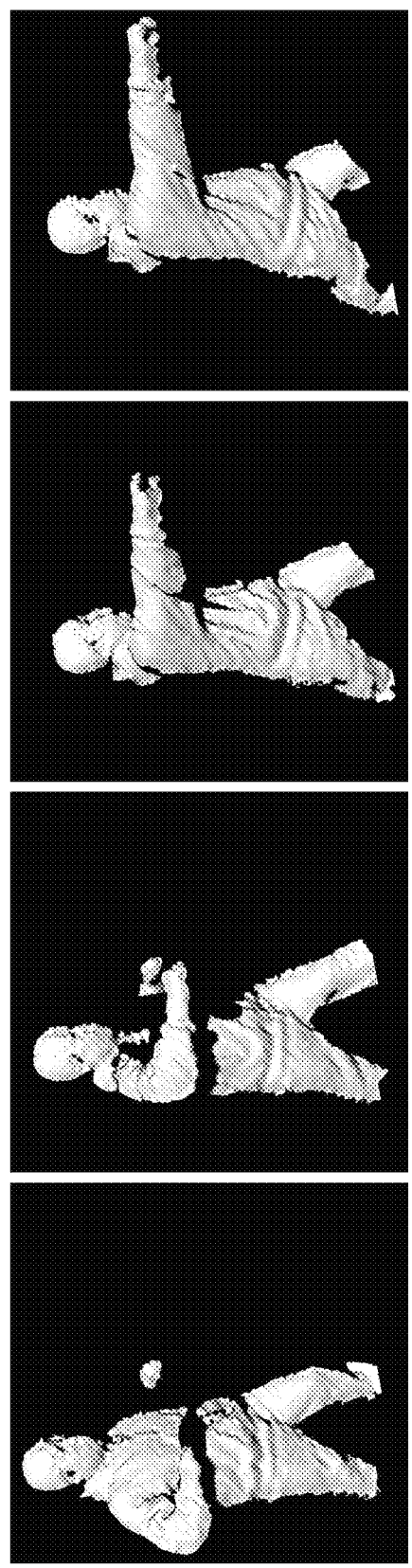
FIG. 28 is a diagram showing a second example for the measurement result of the object in motion.

The result for capturing the human movement that repels a punch is shown in FIGS. 27 and 28. The movement of the right arm was measured in the order of FIGS. 27A to 27D. The measurement results for the movements are shown in FIGS. 28A to 28D. According to the first embodiment, since one-shot reconstruction is performed, 3D reconstruction of the target object can be performed for each independent frame even when the target object moves fast.

The 3D reconstruction (one-shot reconstruction) method for a single image based on the projection of a single-colored and static pattern has been described. The correspondence information is implicitly represented by employing a difference of the patterns at the individual intersection points on a grid pattern of wave lines. Then, when the regularity of the pattern is distorted, the specificity of the pattern is increased, and the stable solution is obtained. Further, a description has also been given for the method whereby the shape reconstruction by the stereo matching method is extended to the use for the projector-camera system by taking the continuity of the grid into account. At the final stage of reconstruction, reconstruction by the grid is interpolated to estimate the depth for each pixel. It is proved that, compared with the conventional method, the more stable results are obtained, and effective measurement for a mobbing object is performed.

The invention claimed is:

1. An image processing system comprising:
    a projection device for projecting a projected pattern to an observation target;
    an imaging device for capturing the projected pattern; and
    an image processing apparatus connected to the projection device and the imaging device, for performing shape reconstruction based on an input image including the projected pattern, the image processing apparatus including a personal computer configured to:
        fetch the input image captured by the imaging device and performing line detection for the projected pattern projected by the projection device, wherein the projected pattern is a grid pattern formed of wave lines, the wave lines are wavy curves having predetermined periodicity, the grid pattern formed of the wave lines is formed of a plurality of wave lines that are arranged at predetermined intervals, the grid pattern is a set of wave lines that intersect each other in two directions, and the interval of the wave lines in one of the directions is not equal to an integral multiple of a wavelength for the wave line in the other direction; and
        perform shape reconstruction by associating intersection points of vertical and horizontal lines extracted by the line detection with the projected pattern.

2. The image processing system according to claim 1, wherein the personal computer is further configured to:
    reproject a patch to an image output by the projection device, wherein the patch obtained by approximating, to a tangent plane, a region around each intersection point of an input image that is captured by the imaging device;
    calculate energy for stereo matching between each intersection point of the reprojected patch and a correspondence candidate for a grid point of the projected pattern projected by the projection device by employing a sum of a data term assigned to each grid point and a regularization term obtained between the grid point and an adjacent grid point, wherein the grid point is an intersection point of the wave lines in two directions of the grid pattern; and
    perform shape reconstruction by associating a grid point with the projected pattern, wherein the grid point is a correspondence candidate having a minimum value of energy for stereo matching among the correspondence candidate.

3. The image processing system according to claim 1, wherein the personal computer is further configured to:
    create a triangular mesh consisting of three pixel samples and calculate a depth of each sub-pixel; and
    calculate, for all of the pixel samples, an error that occurs when the triangular mesh is re-projected to an output image of the projection device, minimize the error obtained, and perform linear interpolation for depths of pixels other than the pixel samples.

4. The image processing system according to claim 2, wherein the projection device includes first and second imaging devices; and
    the personal computer is further configured to select the correspondence candidate by adding a regularization term for the grid point that is obtained between the first and second imaging devices to energy for stereo matching of the correspondence candidates.

5. The image processing system according to claim 4, wherein the personal computer is further configured to employ an average to merge a depth for each pixel that is obtained, for the grid point, between the first and second imaging devices.

6. The image processing system according to claim 1, wherein the projection device includes first and second projection devices; and
    the personal computer is further configured to optimize a depth of each pixel, for grid points for which matching is obtained between a first projected pattern projected by the first projection device and a second projected pattern projected by the second projection device, wherein the grid points are intersection points of the wave lines in two directions of the grid pattern.

7. The image processing system according to claim 1, wherein the personal computer is further configured to perform shape reconstruction by calculating, for a plurality of positions around grid points being intersection points of the wave lines in two directions of the grid pattern, a difference between the projected pattern of the grid points and a result obtained through the line detection, and by employing the result as a matching cost for a correspondence candidate to associate and associating a grid point that is a minimum correspondence candidate with the projected pattern.

8. The image processing system according to claim 1, wherein, when the projected pattern is projected to the observation target, a parameter for the projected pattern is selected by comparing degrees of similarity for two arbitrary intersection points on the same epipolar line so that a degree of similarity becomes minimum.

9. An image processing method of performing shape reconstruction based on an input image including a projected pattern in an image processing apparatus connected to a projection device and an imaging device, wherein the projection device projects a projected pattern to an observation target, and the imaging device captures the projected pattern, the method comprising the steps of:
    fetching, by the image processing apparatus, the input image captured by the imaging device, and performing line detection for the projected pattern projected by the projection device, wherein the projected pattern is a grid pattern formed of wave lines, the wave lines are wavy curves having predetermined periodicity, the grid pattern formed of the wave lines is formed of a plurality of wave lines that are arranged at predetermined intervals, the grid pattern is a set of wave lines that intersect each other in two directions, and the interval of the wave lines in one of the directions is not equal to an integral multiple of a wavelength for the wave line in the other direction; and performing, by the image processing apparatus, shape reconstruction by associating intersection points of vertical and horizontal lines extracted by the line detection with the projected pattern.

10. A non-transitory computer readable storage medium having a computer program stored therein, said computer program including computer executable commands enabling an imaging device to perform shape reconstruction based on an input image including a projected pattern in an image processing apparatus connected to a projection device and the imaging device, wherein the projection device projects a projected pattern to an observation target, and the imaging device captures the projected pattern, the computer executable commands further enabling the imaging device to performing the steps of:

fetching, by the image processing apparatus, the input image captured by the imaging device, and performing line detection for the projected pattern projected by the projection device, wherein the projected pattern is a grid pattern formed of wave lines, the wave lines are wavy curves having predetermined periodicity, the grid pattern formed of the wave lines is formed of a plurality of wave lines that are arranged at predetermined intervals, the grid pattern is a set of wave lines that intersect each other in two directions, and the interval of the wave lines in one of the directions is not equal to an integral multiple of a wavelength for the wave line in the other direction; and performing, by the image processing apparatus, shape reconstruction by associating intersection points of vertical and horizontal lines extracted by the line detection with the projected pattern.

* * * * *